(12) United States Patent
Nunez et al.

(10) Patent No.: US 9,506,355 B2
(45) Date of Patent: Nov. 29, 2016

(54) TURBINE ENGINE BLADE OR VANE MADE OF COMPOSITE MATERIAL, TURBINE NOZZLE OR COMPRESSOR STATOR INCORPORATING SUCH VANES AND METHOD OF FABRICATING SAME

(75) Inventors: Romain Nunez, Martignas sur Jalle (FR); Stephane Blanchard, Chartrettes (FR); Guillaume Renon, Vaux le Penil (FR); Dominique Coupe, Le Haillan (FR); Clement Roussille, Bordeaux (FR); Antoine Jean-Philippe Beaujard, Moissy-Cramayel (FR); Elric Georges Andre Fremont, Merignac (FR)

(73) Assignees: Snecma, Paris (FR); Herakles, Le Haillan (FR)

( * ) Notice: Subject to any disclaimer, the term of this patent is extended or adjusted under 35 U.S.C. 154(b) by 1293 days.

(21) Appl. No.: 13/607,371

(22) Filed: Sep. 7, 2012

(65) Prior Publication Data
US 2014/0030076 A1    Jan. 30, 2014

Related U.S. Application Data

(63) Continuation-in-part of application No. 13/515,879, filed as application No. PCT/FR2010/052666 on Dec. 10, 2010.

(30) Foreign Application Priority Data

Dec. 14, 2009    (FR) ...................................... 09 58931
Sep. 7, 2011    (FR) ...................................... 11 57925

(51) Int. Cl.
*F01D 5/28*    (2006.01)
*B29C 70/22*    (2006.01)
(Continued)

(52) U.S. Cl.
CPC ............ *F01D 5/282* (2013.01); *B29C 70/222* (2013.01); *C04B 35/571* (2013.01);
(Continued)

(58) Field of Classification Search
CPC .............................................. C04B 2235/5256
See application file for complete search history.

(56) References Cited

U.S. PATENT DOCUMENTS 3,632,460 A    1/1972   Palfreyman et al.
5,845,398 A  * 12/1998  Maumus ................. F01D 5/048
                                                    29/889.2
(Continued)

FOREIGN PATENT DOCUMENTS

EP    1 526 285       4/2005
EP    1 607 581      12/2005
(Continued)

OTHER PUBLICATIONS

U.S. Appl. No. 13/607,131, filed Sep. 7, 2012, Roussille, et al.
(Continued)

*Primary Examiner* — Craig Kim
*Assistant Examiner* — Michael Sehn
(74) *Attorney, Agent, or Firm* — Oblon, McClelland, Maier & Neustadt, L.L.P.

(57) ABSTRACT

A method for fabricating turbine engine blade or vane made of composite material includes: performing three-dimensional weaving to make a single-piece fiber blank; shaping the fiber blank to obtain a single-piece fiber preform having a first portion forming a preform for at least a blade/vane airfoil, at least one second portion forming a preform for an inner part of a blade/vane inner platform or for an outer part of a blade/vane outer platform, and at least one third portion forming a preform for an outer part of a blade/vane inner platform or for an inner part of a blade/vane outer platform; and densifying the fiber preform with a matrix to obtain a composite material blade, and forming a single piece with an inner and/or outer platform(s) incorporated therein.

32 Claims, 16 Drawing Sheets

(51) Int. Cl.
- *C04B 35/571* (2006.01)
- *C04B 35/628* (2006.01)
- *C04B 35/80* (2006.01)
- *C04B 37/00* (2006.01)
- *B29L 31/08* (2006.01)

(52) U.S. Cl.
CPC .. *C04B 35/62868* (2013.01); *C04B 35/62873* (2013.01); *C04B 35/62884* (2013.01); *C04B 35/62894* (2013.01); *C04B 35/62897* (2013.01); *C04B 35/806* (2013.01); *C04B 37/006* (2013.01); *C04B 37/008* (2013.01); *F01D 5/284* (2013.01); *B29L 2031/08* (2013.01); *C04B 2235/483* (2013.01); *C04B 2235/5244* (2013.01); *C04B 2235/5256* (2013.01); *C04B 2235/612* (2013.01); *C04B 2235/614* (2013.01); *C04B 2237/123* (2013.01); *C04B 2237/127* (2013.01); *C04B 2237/128* (2013.01); *C04B 2237/365* (2013.01); *C04B 2237/38* (2013.01); *F05D 2300/6033* (2013.01); *Y02T 50/672* (2013.01); *Y02T 50/673* (2013.01); *Y10T 29/49336* (2015.01)

(56) References Cited

U.S. PATENT DOCUMENTS

| | | | |
|---|---|---|---|
| 5,854,154 A | 12/1998 | Radford et al. | |
| 5,990,025 A * | 11/1999 | Suyama | C04B 35/573 428/570 |
| 6,196,794 B1 | 3/2001 | Matsumoto | |
| 6,227,798 B1 | 5/2001 | Demers et al. | |
| 6,416,278 B1 * | 7/2002 | Caddell, Jr. | B23P 6/002 29/402.03 |
| 6,676,373 B2 * | 1/2004 | Marlin | B29C 70/34 29/889.71 |
| 6,821,087 B2 * | 11/2004 | Matsumoto | F01D 5/282 415/191 |
| 7,241,112 B2 * | 7/2007 | Dambrine | B29C 70/48 29/889.7 |
| 2005/0084377 A1 | 4/2005 | Dambrine et al. | |
| 2006/0257260 A1 | 11/2006 | Dambrine et al. | |
| 2007/0154318 A1 | 7/2007 | Saltman et al. | |
| 2007/0248780 A1 | 10/2007 | Schober et al. | |

FOREIGN PATENT DOCUMENTS

| | | |
|---|---|---|
| FR | 2 664 518 | 1/1992 |
| FR | 2 745 808 | 9/1997 |
| JP | 2003-148105 | 5/2003 |
| WO | 2005/011962 | 2/2005 |
| WO | 2010/061140 | 6/2010 |
| WO | 2010/116066 | 10/2010 |
| WO | 2011/080443 | 7/2011 |

OTHER PUBLICATIONS

U.S. Appl. No. 13/606,935, filed Sep. 7, 2012, Roussille, et al.

A. P. Mouritz et al., "Review of Applications for Advanced Three-Dimensional Fibre Textile Composites," Composites: Part A, Applied Science and Manufacturing, vol. 30, No. 12, pp. 1445-1461, (Dec. 1, 1999).

International Search Report Issued Apr. 13, 2011 in PCT/FR10/52666 filed Dec. 10, 2010.

French Search Report Issued May 2, 2012 in FR 1157925 filed Sep. 7, 2011.

* cited by examiner

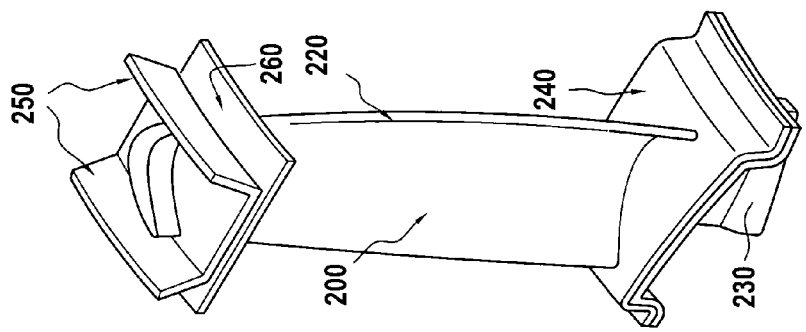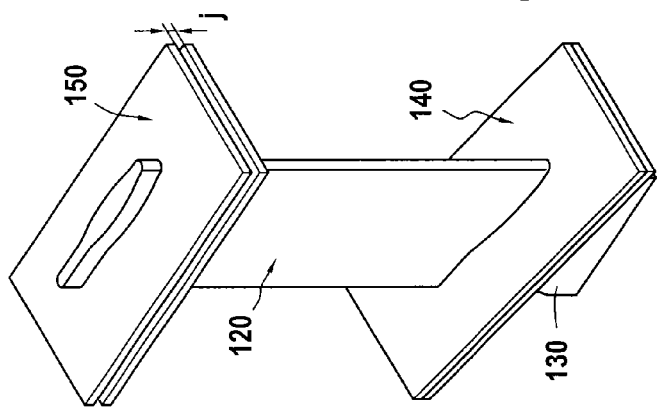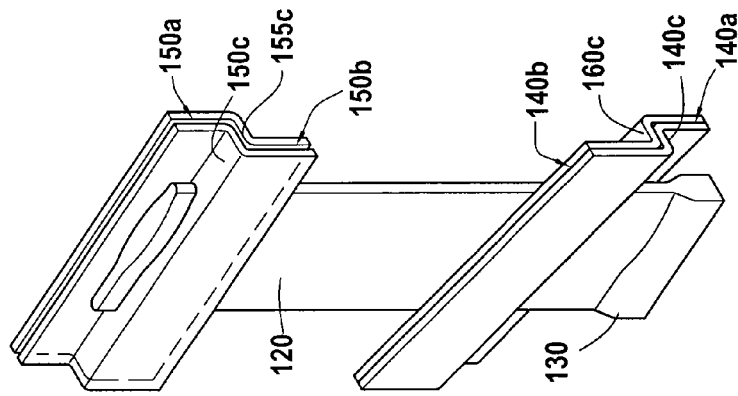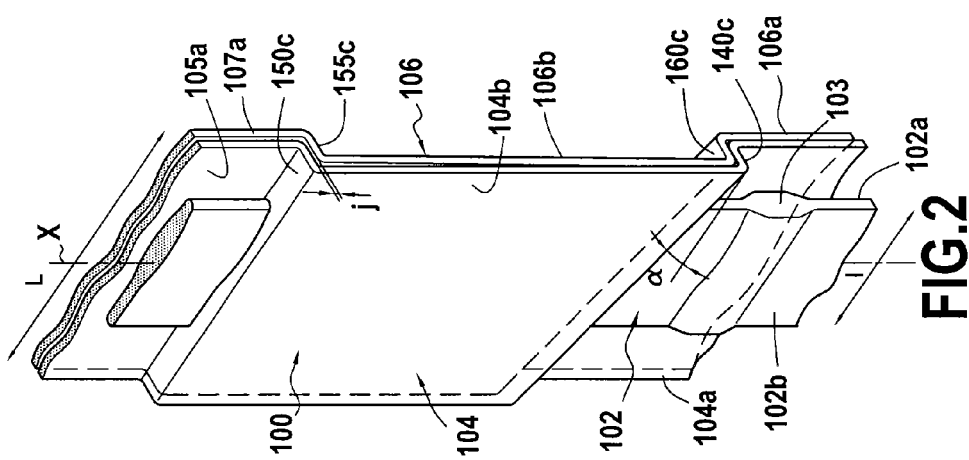

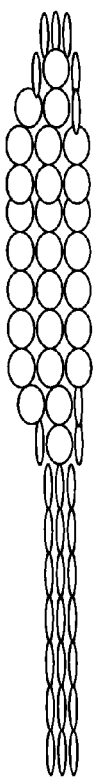
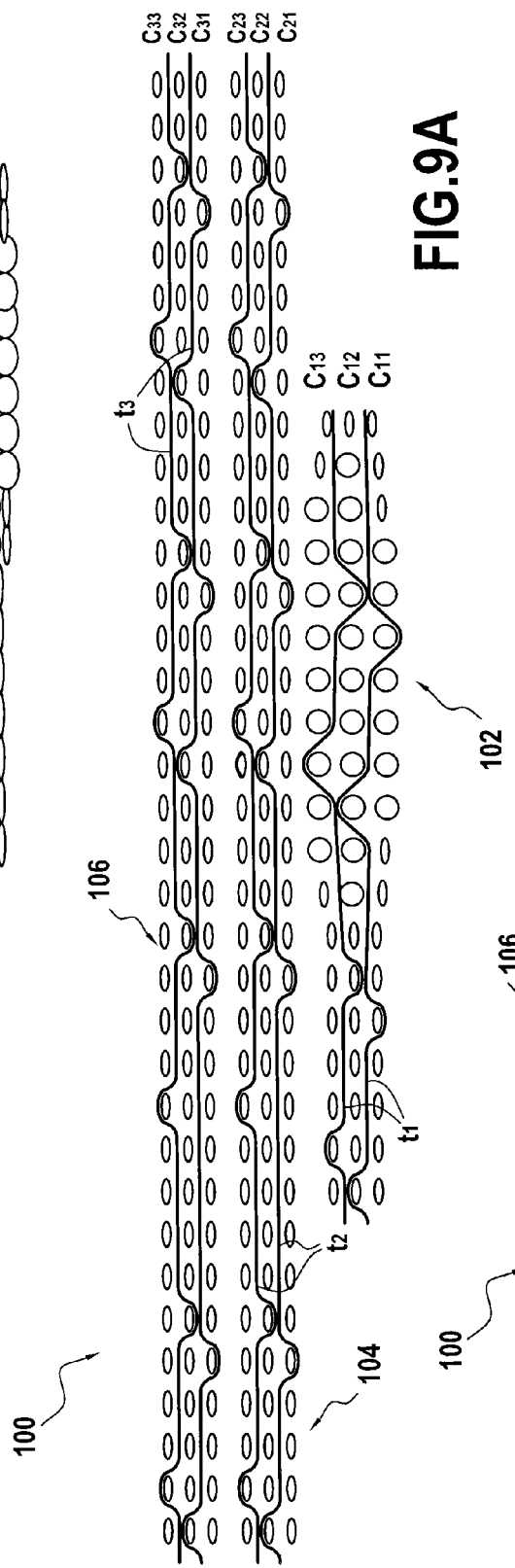
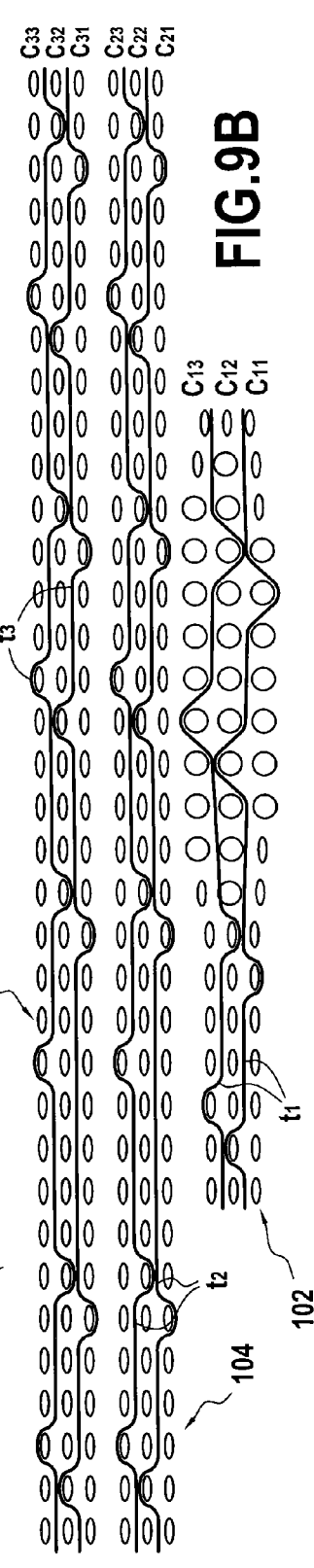
FIG.7
FIG.8
FIG.9A
FIG.9B

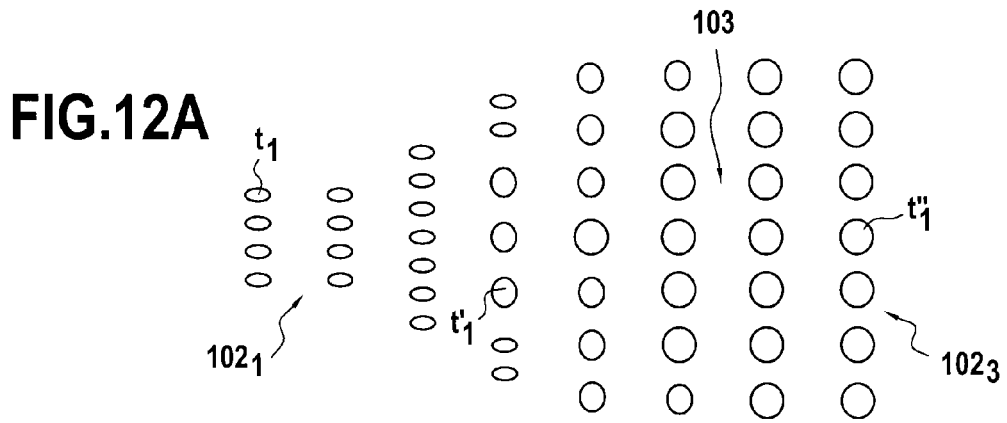
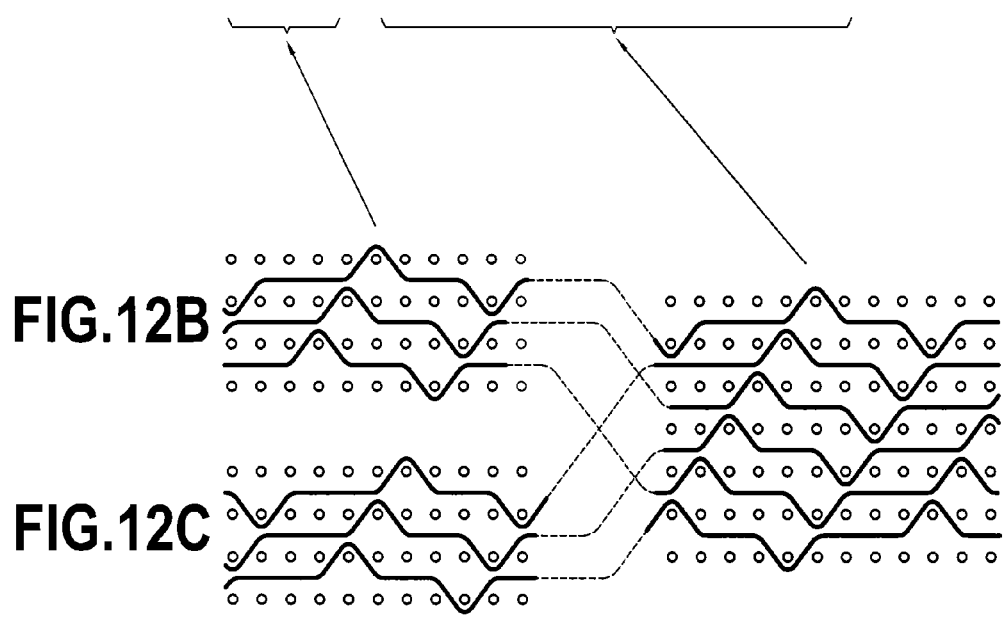
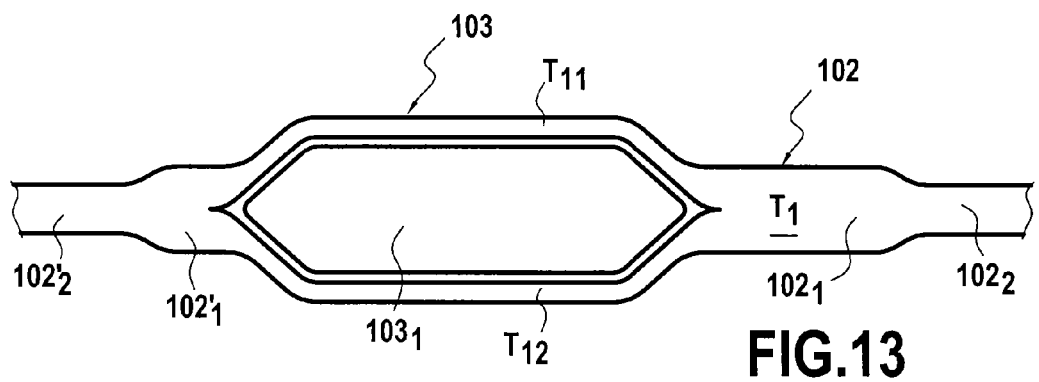

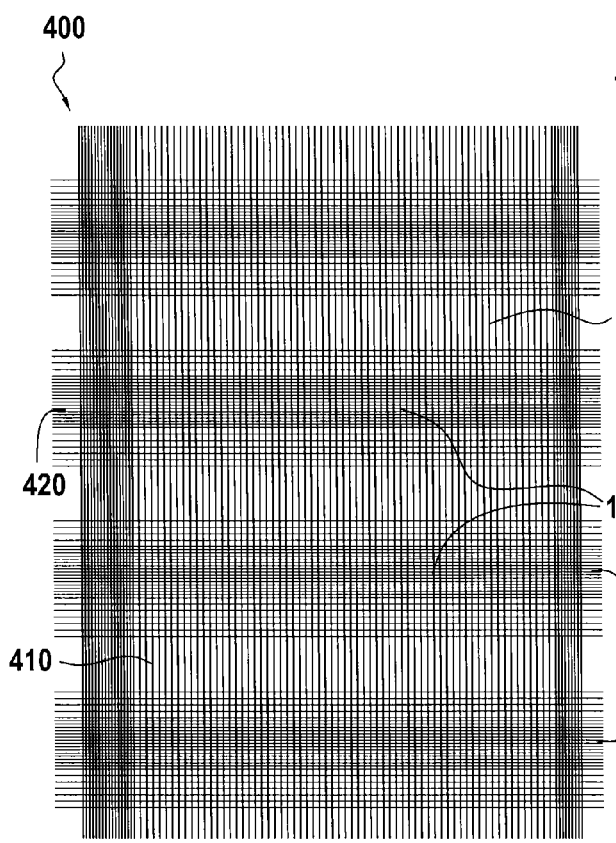
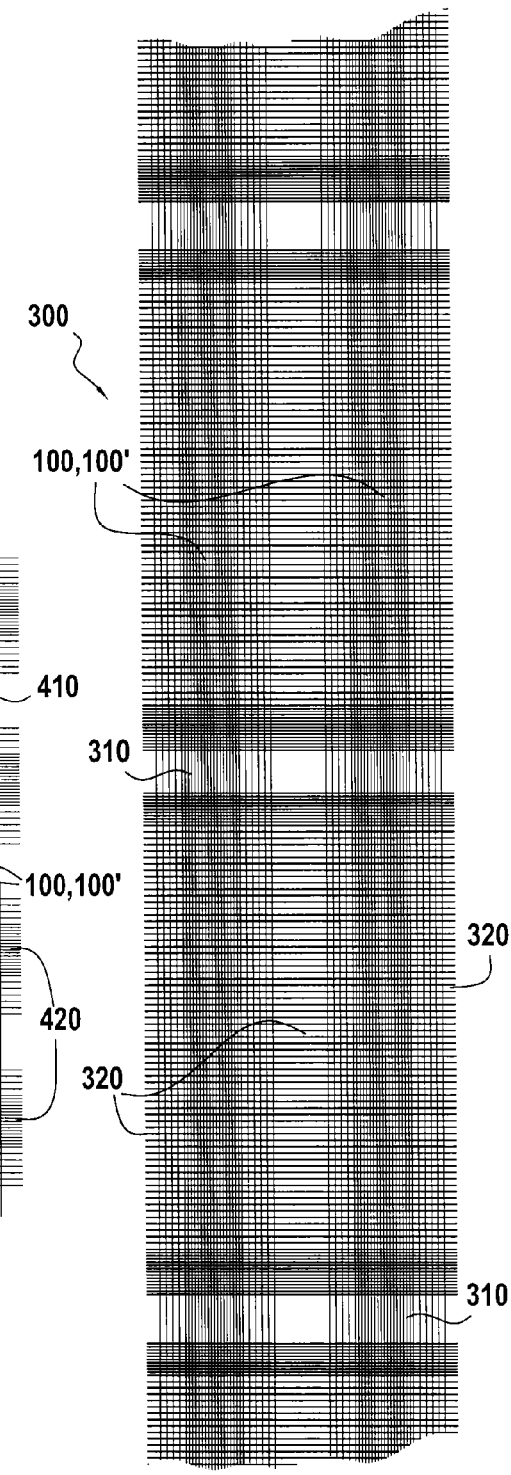
FIG.15
FIG.14

TURBINE ENGINE BLADE OR VANE MADE OF COMPOSITE MATERIAL, TURBINE NOZZLE OR COMPRESSOR STATOR INCORPORATING SUCH VANES AND METHOD OF FABRICATING SAME

RELATED APPLICATIONS

The present application is a Continuation-in-Part Application of U.S. patent application Ser. No. 13/515,879 claiming priority of French Patent Application No 0958931 filed on Dec. 14, 2009 and incorporates subject matter derived from French Patent Application No 1157925 filed on Sep. 7, 2011, of which priority is also claimed.

BACKGROUND OF THE INVENTION

The invention relates to turbine engine blades or vanes made of composite material comprising fiber reinforcement densified by a matrix. The invention relates also to compressor stator segments and turbine nozzle segments incorporating such composite material vanes.

The intended field is that of gas turbine blades or vanes for aeroengines or industrial turbines.

Proposals have already been made to fabricate composite material blades for turbine engines. Reference may be made in particular to patent applications FR 2 939 129 and FR 2 939 130 filed jointly by Snecma and Snecma Propulsion Solide. Those applications describe in particular fabricating a turbine engine blade out of composite material comprising fiber reinforcement densified by a matrix. More precisely, the method described in those two documents and applied to fabricating a blade presents the special feature of a fiber blank that is made by three-dimensional weaving and that is shaped in order to obtain a single-piece fiber preform with a first portion forming a preform for a blade root and an airfoil, and at least one second portion forming a preform for an inner or an outer platform of the blade. Thus, once the preform has been densified, it is possible to obtain a composite material blade having fiber reinforcement constituted by the preform and densified by the matrix, and forming a single piece that has an inner or an outer platform incorporated therein.

The blade obtained by such a method presents the drawback that its outer platform cannot incorporate both a function of providing sealing with the casing that surrounds the blades (by having wipers present) and an aerodynamic function (by having overhangs present that define the outside of gas flowpath through the turbine). Furthermore, at its root, the overhangs of the inner blade platform that is obtained by that method can break under the effect of the high levels of force to which they are subjected in operation (this force being due to the centrifugal force of rotation).

Use of CMC materials has also been proposed for turbine nozzles, in particular in application WO 2010/146288.

A conventional metallic turbine nozzle or compressor stator is formed of several assembled sectors, each sector comprising an inner platform, an outer platform and a plurality of airfoils extending between the inner and outer platforms and integral therewith. The inner and outer platforms delimit the gas or air flow passage in the turbine nozzle or compressor stator. On the outside, the outer platforms of the segments are formed integrally with legs allowing the mounting of the turbine nozzle or compressor stator in a casing.

OBJECTS AND SUMMARY OF THE INVENTION

An object of the present invention is thus to mitigate such drawbacks by proposing a blade of composite material that forms a single piece having an inner and/or an outer platform incorporated therein, and in which the outer and inner platforms present the required properties. An object of the present invention is also to propose a turbomachine vane of composite material that forms a single piece having an inner and/or an outer platform incorporated therein.

This object is achieved by a method of fabricating a turbine engine blade or vane out of composite material comprising fiber reinforcement densified by a matrix, the method comprising:

performing three-dimensional weaving to make a single-piece fiber blank;

shaping the fiber blank to obtain a single-piece fiber preform having a first portion forming a preform for at least a blade or vane airfoil, at least one second portion forming a preform for an inner part of a blade or vane inner platform or for an outer part of a blade or vane outer platform, and at least one third portion forming a preform for an outer part of a blade or vane inner platform or for an inner part of a blade or vane outer platform; and densifying the fiber preform with a matrix in order to obtain a composite material blade having fiber reinforcement constituted by the preform and densified by the matrix, and forming a single piece with an inner and/or outer platform(s) incorporated therein.

According to an advantageous feature of the method, in the longitudinal direction corresponding to the longitudinal direction of the fiber blank that is to be fabricated, the fiber blank comprises:

a first set of a plurality of yarn layers that are linked together to form a first portion of the blank corresponding to at least the blade or vane airfoil preform;

a second set of a plurality of yarn layers that are linked together at least locally to form at least a second portion of the blank corresponding to the inner part of the blade or vane inner platform preform or to the outer part of the blade or vane outer platform preform; and a third set of a plurality of yarn layers that are linked together at least locally to form at least a third portion of the blank corresponding to the outer part of the blade or vane inner platform preform or to the inner part of the blade or vane outer platform preform;

the yarns of the first set of yarn layers being not linked with the yarns of the second and third sets of yarn layers; and yarns of the second and third sets of yarn layers crossing through the first set of yarn layers at the level of the or each second portion of the fiber blank and at the level of the or each third portion of the fiber blank, respectively.

Providing non-linked zones enables the fiber preform to be shaped without cutting linking yarns, where such cutting can reduce the mechanical strength of the fiber reinforcement and thus of the blade or vane that is fabricated therefrom.

According to another particular feature of the method, the fiber blank is woven with second and third continuous sets of yarn layers and the shaping of the fiber blank includes eliminating portions of the second and third sets of yarn layers that lie outside the or each second fiber blank portion and the or each third fiber blank portion by cutting them off.

Yarns of the second and third sets of yarn layers may cross through the first set of yarn layers in the same direction.

Alternatively, yarns of the second and third sets of yarn layers cross through the first set of yarn layers in opposite directions.

In a particular embodiment, the blade or vane airfoil has a profile of varying thickness and the first portion of the fiber reinforcement corresponding to the first portion of the blade or vane has, in the longitudinal direction of the blade or vane, a constant number of layers of yarns. The yarns of the first set of yarns may then be of varying weight and/or thread count.

Advantageously, three-dimensional weaving is used to make a strip comprising a succession of fiber blanks. They may then be cut out from the strip. The blanks may be woven with their longitudinal direction that corresponds to the direction of the blades or vanes that are to be fabricated extending either in the weft direction or in the warp direction.

The invention also provides a method for fabricating a turbine engine blade out of composite material comprising fiber reinforcement densified by a matrix, the method comprising:

performing three-dimensional weaving to make a single-piece fiber blank;

shaping the fiber blank to obtain a single-piece fiber preform having a first portion forming a preform for a blade root and an airfoil, at least one second portion forming a preform for a blade inner platform or for wipers of a blade outer platform, and at least one third portion forming a preform for a blade inner platform reinforcement or for overhangs of a blade outer platform; and densifying the fiber preform with a matrix in order to obtain a composite material blade having fiber reinforcement constituted by the preform and densified by the matrix, and forming a single piece with an inner and/or outer platform(s) incorporated therein.

Compared with the method described in patent application FR 2 939 129 and in patent application FR 2 939 130 in its application to fabricating a blade, the invention applies in particular to making use of a third portion while shaping the fiber blank, which third portion forms a preform for reinforcement of a blade inner platform or for overhangs of a blade outer platform. As a result, the blade obtained by the method of the invention may present the required properties, i.e. a sealing function and an aerodynamic function at its outer platform and an inner platform having twice the thickness, thereby reinforcing its mechanical strength.

Furthermore, when the third portion of the fiber preform is used to form a preform for an overhang of a blade outer platform, the blade obtained by the method of the invention enables the flowpath for the gas stream passing through the turbine in which the blade is installed to be reconstituted in part both on the inside (by the blade inner platform) and on the outside (by the overhangs of the blade outer platform).

Advantageously, in the longitudinal direction corresponding to the longitudinal direction of the fiber blank that is to be fabricated, the fiber blank comprises:

a first set of a plurality of yarn layers that are linked together to form a first portion of the blank corresponding to the preform for the blade root and airfoil; a second set of a plurality of yarn layers that are linked together at least locally to form at least a second portion of the blank corresponding to the preform for the blade inner platform or for the wipers of the blade outer platform; and a third set of a plurality of yarn layers that are linked together at least locally to form at least a third portion of the blank corresponding to the preform for the reinforcement of the blade inner platform or for the overhangs of the blade outer platform;

the yarns of the first set of yarn layers being not linked with the yarns of the second and third sets of yarn layers; and yarns of the second and third sets of yarn layers crossing through the first set of yarn layers at the level of the or each second portion of the fiber blank and at the level of the or each third portion of the fiber blank, respectively.

The invention also provides a method for fabricating a turbine engine vane out of composite material comprising fiber reinforcement densified by a matrix, the method comprising:

performing three-dimensional weaving to make a single-piece fiber blank;

shaping the fiber blank to obtain a single-piece fiber preform having a first portion forming a preform for a vane airfoil, at least one second portion forming a preform for hooks or overhangs of a vane inner platform on the inside of the vane inner platform or forming a preform for hooking legs of a vane outer platform on the outside of the vane outer platform, and third portions forming a preform for a vane inner platform portion forming a flowpath delimiting inner platform portion and forming a preform for a vane outer platform portion forming a flowpath delimiting outer platform portion; and densifying the fiber preform with a matrix in order to obtain a composite material vane having fiber reinforcement constituted by the preform and densified by the matrix, and forming a single piece with inner and outer platforms incorporated therein.

Advantageously, in the longitudinal direction corresponding to the longitudinal direction of the fiber blank that is to be fabricated, the fiber blank comprises:

a first set of a plurality of yarn layers that are linked together to form a first portion of the blank corresponding to the preform for the vane airfoil; a second set of a plurality of yarn layers that are linked together at least locally to form at least a second portion of the blank corresponding to the preform for the hooks or overhangs of the vane inner platform or for the hooking legs of the vane outer platform, and a third set of a plurality of yarn layers that are linked together at least locally to form third portions of the blank corresponding to the preforms for the blade inner platform portion and for the blade outer platform portion;

the yarns of the first set of yarn layers being not linked with the yarns of the second and third sets of yarn layers; and yarns of the second and third sets of yarn layers crossing through the first set of yarn layers at the level of the or each second portion of the fiber blank and at the level of each third portion of the fiber blank, respectively.

The invention also provides a method for fabricating a turbine nozzle segment or compressor stator segment out of a composite material comprising fiber reinforcement densified by a matrix for a turbine engine, the method comprising:

making a plurality of turbine nozzle vanes or compressor stator vanes each including an inner platform, an outer platform and an airfoil extending between the inner and outer platforms and forming one piece therewith, the making of each vane comprising:

performing three-dimensional weaving to make a single-piece fiber blank;

shaping the fiber blank to obtain a single-piece fiber preform having a first portion forming a preform for a vane airfoil, at least one second portion forming a preform for hooks or overhangs of the vane inner platform on the inside of the vane inner platform or forming a preform for hooking legs of the vane outer platform on the outside of the vane outer platform, and third portions forming a preform for a vane inner platform portion forming a flowpath delimiting inner platform portion and forming a preform for a vane outer platform portion forming a flowpath delimiting outer platform portion; and densifying the fiber preform with a matrix in order to obtain a composite material vane having fiber reinforcement constituted by the preform and densified by the matrix, and forming a single piece with inner and outer platforms incorporated therein; and assembling and connecting together a plurality of vanes to form a multi-vane turbine nozzle segment or compressor stator segment out of a composite material, the vanes being connected together by a process including a step selected from a brazing step and a step of connection by co-densification by a matrix of a plurality of vanes assembled together at an intermediary stage of densification.

The making of each vane may comprise a step of partial densification of the preform by a matrix and a subsequent machining step, and the connection of a plurality of vanes together comprises then assembling machined vanes together and co-densification by a matrix of the assembled machined vanes.

When the turbine nozzle segment or compressor stator segment is made out of a ceramic matrix composite material, the assembling of the machined vanes together may comprise a pre-ceramic bonding step.

Still when the turbine nozzle segment or compressor stator segment is made out of a ceramic matrix composite material, the making of each vane may comprise a first and a second step of densification by a ceramic matrix separated by a machining step, and the connection of a plurality of vanes together comprises a step of brazing together vanes assembled together after the second densification step.

Advantageously, in the longitudinal direction corresponding to the longitudinal direction of the fiber blank that is to be fabricated, the fiber blank comprises:

a first set of a plurality of yarn layers that are linked together to form a first portion of the blank corresponding to the preform for the vane airfoil; a second set of a plurality of yarn layers that are linked together at least locally to form at least a second portion of the blank corresponding to the preform for the hooks or overhangs of the vane inner platform or for the hooking legs of the vane outer platform, and a third set of a plurality of yarn layers that are linked together at least locally to form third portions of the blank corresponding to the preforms for the vane inner platform portion and for the vane outer platform portion;

the yarns of the first set of yarn layers being not linked with the yarns of the second and third sets of yarn layers; and yarns of the second and third sets of yarn layers crossing through the first set of yarn layers at the level of the or each second portion of the fiber blank and at the level of each third portion of the fiber blank, respectively.

The present invention also provides a turbine engine blade or vane made of composite material comprising fiber reinforcement obtained by three-dimensional weaving of yarns and densified by means of a matrix, the blade or vane comprising a first portion constituting at least an airfoil of the blade or vane and that is formed integrally with:

at least one second portion constituting an inner part of a blade or vane inner platform or an outer part of a blade or vane outer platform; and at least one third portion constituting an outer part of a blade or vane inner platform or an inner part of a blade or vane outer platform;

first, second and third portions of the fiber reinforcement corresponding to the first, second, and third portions of the blade or vane being mutually interleaved at least in part with the yarns of the first portion of fiber reinforcement penetrating into the second portion of fiber reinforcement and into the third portion of the fiber reinforcement.

The blade or vane may be made of ceramic matrix composite material.

According to a particular feature of the blade or vane, yarns of the second portion and of the third portion of the fiber reinforcement cross through the first portion of the fiber reinforcement.

The blade or vane airfoil may have a profile of varying thickness and the first portion of the fiber reinforcement corresponding to the first portion of the blade or vane may have, in the longitudinal direction of the blade or vane, a constant number of layers of yarns that are of varying weight and/or varying thread count.

In a particular embodiment, the invention provides a turbine engine blade made of composite material comprising fiber reinforcement obtained by three-dimensional weaving of yarns and densified by means of a matrix, the blade comprising a first portion constituting an airfoil and root of the blade and that is formed integrally with:

at least one second portion constituting a blade inner platform or wipers of a blade outer platform; and at least one third portion constituting an inner platform reinforcement or overhangs of a blade outer platform;

first, second and third portions of the fiber reinforcement corresponding to the first, second, and third blade portions being mutually interleaved at least in part, with the yarns of the first portion of fiber reinforcement penetrating into the second portion of fiber reinforcement and into the third portion of the fiber reinforcement.

According to a particular feature of the blade, yarns of the second portion and of the third portion of the fiber reinforcement cross through the first portion of the fiber reinforcement.

In a particular embodiment, the invention provides a turbine engine vane made of composite material comprising fiber reinforcement obtained by three-dimensional weaving of yarns and densified by means of a matrix, the vane comprising a first portion constituting an airfoil of the vane and that is formed integrally with:

at least one second portion constituting hooks or overhangs on the inside of a vane inner platform or hooking legs on the outside of a vane outer platform; and at least one third portion constituting a flowpath delimiting inner platform portion or a flowpath delimiting outer platform portion;

first, second and third portions of the fiber reinforcement corresponding to the first, second, and third portions of the vane being mutually interleaved at least in part with the yarns of the first portion of fiber reinforcement penetrating into the second portion of fiber reinforcement and into the third portion of the fiber reinforcement.

According to a particular feature of the vane, yarns of the second portion and of the third portion of the fiber reinforcement cross through the first portion of the fiber reinforcement.

The invention also provides a turbine nozzle segment or a compressor stator segment comprising a plurality of vanes as defined above which are connected together.

The invention also provides a turbine engine fitted with at least one blade or vane as defined above.

BRIEF DESCRIPTION OF THE DRAWINGS

Other characteristics and advantages of the present invention appear from the following description made with reference to the accompanying drawings, which show implementations having no limiting character. In the figures:

FIG. 2 is a highly diagrammatic view of an example arrangement of three sets of layers of yarns in a three-dimensional woven fiber blank for use in making a fiber preform for a blade of the kind shown in FIG. 1;

FIGS. 3, 4, and 5 show successive steps in the making of a fiber preform for a blade as shown in FIG. 1, starting from the fiber blank of FIG. 2;

FIG. 7 is a section view showing the profile laid out flat of an airfoil of a blade such as that shown in FIG. 1;

FIG. 8 is a section view of a set of warp yarn layers suitable for obtaining a profile of the kind shown in FIG. 7;

FIGS. 9A and 9B are warp section views showing one way of weaving the FIG. 2 fiber blank;

FIG. 12A is a weft section view showing an example of the arrangement of weft yarns in a fiber blank portion corresponding to a portion of the blade root;

FIGS. 12B to 12D are weft section views showing warp planes for an example of (multilayer) three-dimensional weaving in the fiber blank portion of FIG. 12A;

FIG. 13 is a fragmentary diagrammatic section view showing another way of making a blank portion corresponding to a blade root;

FIGS. 14 and 15 are highly diagrammatic views of two embodiments of a woven fiber strip obtained by three-dimensional weaving and comprising a plurality of fiber blanks such as that of FIG. 2;

DETAILED DESCRIPTION OF IMPLEMENTATIONS

First Embodiment

Turbine Engine CMC Blades

Figure 1:
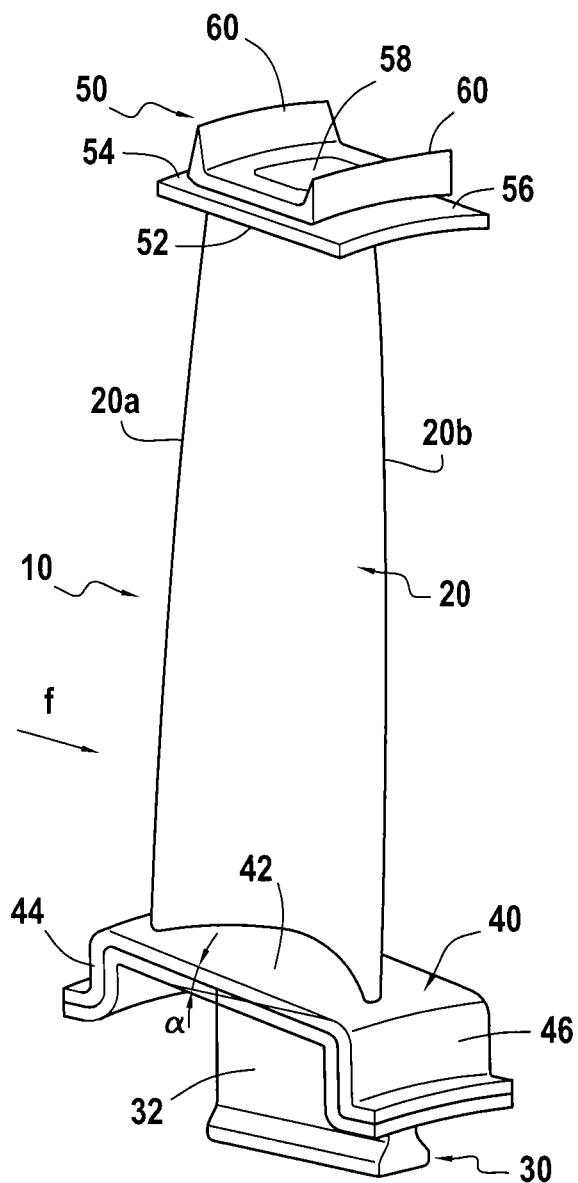
FIG. 1 is a perspective view of a turbine engine blade having inner and outer platforms incorporated therein.

The invention is applicable to various types of turbine engine blade having inner and/or outer platforms incorporated therein, in particular compressor and turbine blades of various gas turbine spools, e.g. a low pressure (LP) turbine rotor blade such as that shown in FIG. 1.

The blade 10 of FIG. 1 comprises in well-known manner an airfoil 20, a root 30 constituted by a portion of greater thickness, e.g. having a bulb-shaped section and extended by a tang 32, an inner platform 40 situated between the tang 32 and the airfoil 20, and an outer platform 50 in the vicinity of the free end of the blade.

The airfoil 20 extends in a longitudinal direction between the inner platform 40 and the outer platform 50 and in cross-section it presents a curved profile of varying thickness between its leading edge 20a and its trailing edge 20b.

The blade 10 is mounted on a turbine rotor (not shown) by engaging the root 30 in a housing of complementary shape formed at the periphery of the rotor. The root 30 is extended by the tang 32 so as to connect with the inner (or bottom) face of the inner platform 40;

At its radially inner end, the airfoil 20 is connected to an outer (or top) face 42 of the inner platform 40, which face defines the inside of the flowpath through the turbine. In its upstream and downstream end portions (in the flow direction f of the gas stream), the platform is terminated by overhangs 44 and 46. In the example shown, the face 42 of the inner platform slopes so that overall it forms a non-zero angle α relative to the normal to the longitudinal direction of the blade. Depending on the profile desired for the inside surface of the flowpath, the angle α may be zero, or the face 42 may have a profile that is generally not rectilinear, e.g. a curved profile.

At its radially outer end, the airfoil is connected to the outer platform 50 via an inner (bottom) face 52 of the platform that defines the outside of the flowpath. In its upstream and downstream portions, the outer platform is terminated by overhangs 54 and 56. On the outside (on top), the outer platform defines a depression or bathtub 58. Along the upstream and downstream edges of the bathtub 58, the platform carries wipers 60 presenting a tooth-shaped profile with tips suitable for penetrating into a layer of abradable material of a turbine ring (not shown) so as to reduce the clearance between the tip of the blade and the turbine ring. In the example shown, the face 52 of the outer platform extends substantially perpendicularly to the longitudinal direction of the blade. In a variant, and depending on the profile desired for the outside surface of the flowpath, the face 52 could be inclined so as to form overall a non-zero angle relative to the normal to the longitudinal direction of the blade, or else the face 52 could have a profile that is generally not rectilinear, e.g. a curved profile.

FIG. 2 is a highly diagrammatic view of a fiber blank 100 from which a blade fiber preform can be shaped so that once it has been densified with a matrix and possibly also machined, a composite material blade is obtained having platforms incorporated therein, like the blade shown in FIG. 1.

The blank 100 comprises three portions 102, 104, and 106 that are obtained by three-dimensional weaving or multi-layer weaving, and only the envelopes of these three portions are shown in FIG. 2. After shaping, the portion 102 is to constitute a blade fiber preform portion that corresponds to a preform for the airfoil and the root of the blade. After shaping, the portion 104 is designed to constitute the portions of the blade fiber preform that correspond to preforms for the inner platform of the blade and for the wipers of the outer platform of the blade. After shaping, the portion 106 is to constitute portions of the blade fiber preform that correspond to preforms for reinforcement of the blade inner platform and for the overhangs of the blade outer platform.

The three portions 102, 104, and 106 are in the form of strips that extend generally in a direction X that corresponds to the longitudinal direction of the blade that is to be made. In its portion that is to form an airfoil preform, the fiber strip 102 presents varying thickness that is determined as a function of the thickness of the profile of the airfoil of the blade that is to be made. In its portion that is to form a root preform, the fiber strip 102 presents extra thickness 103 that is determined as a function of the thickness of the root of the blade that is to be made.

The fiber strip 102 has a width l that is selected as a function of the length of the developed (i.e. flat) profile of the airfoil and of the root of the blade that is to be made, whereas each of the fiber strips 104 and 106 has a width L greater than l that is selected as a function of the developed lengths of the inner and outer platforms of the blade that is to be made.

The fiber strips 104 and 106 are of substantially the same width, and each of them is of substantially constant thickness that is determined as a function of the thicknesses of the inner and outer platforms of the blade that is to be made. Each of the strips 104 and 106 has a first portion 104a, 106a that extends along and in the vicinity of a first face 102a of the strip 102, a second portion 104b, 106b that extends along and in the vicinity of the second face 102b of the strip 102, and a third portion 105a, 107a that extends along and in the vicinity of the first face 102a of the strip 102.

The portions 104a and 104b of the strip 104 are connected together by a connection portion 140c that extends transversely relative to the strip 102 at a location corresponding to the location of the inner platform of the blade that is to be made. The connection portion 140c crosses through the strip, forming an angle α relative to the normal to the longitudinal direction of the fiber blank. Similarly, the portions 106a and 106b of the strip 106 are connected together by a connection portion 160c that extends transversely relative to the strip 102 and that is substantially parallel to the connection strip 140c (possibly being spaced apart therefrom).

The portions 104b and 105a of the strip 104 are connected together by a connection portion 150c that extends transversely relative to the strip 102 at a location corresponding to the location of the outer platform of the blade to be made. In the example shown, the connection portion 150c crosses through the strip 102 substantially perpendicularly to the longitudinal direction X of the fiber blank. Similarly, the portions 106b and 107a of the strip 106 are connected together by a connection portion 155c that extends transversely relative to the strip 102 and that is substantially parallel to and spaced apart from the connection strip 150c by clearance j.

Depending on the shape desired for the outer platform of the blade, the connection portions 150c, 155c may cross through the strip 102 so as to form a non-zero angle relative to the normal to the longitudinal direction X of the blank, as with the inner platform. In addition, the profiles of the connection portions 140c, 160c and/or the profiles of the connection portions 150c, 155c may be curvilinear instead of being rectilinear as in the examples shown.

The clearance j provided between the connection portions 150c and 155c could also be zero. Similarly, it is possible to provide non-zero clearance between the connection portions 140c and 160c.

As described in greater detail below, the strips 102, 104, and 106 are woven simultaneously by three-dimensional weaving, without interlinking, firstly between the strip 102 and the portions 104a, 104b, and 105a of the strip 104, and secondly between the strip 102 and the portions 106a, 106b, and 107a of the strip 106, and while weaving a plurality of successive blanks 100 continuously in the direction X. Likewise, no interlinking is provided between the various portions of the strips 104 and 106.

FIGS. 3 to 5 show very diagrammatically how a fiber preform having a shape close to the shape of the blade that is to be fabricated can be obtained starting from the fiber blank 100.

The fiber strip 102 is cut at one end through the extra thickness 103 and at another end a little beyond the connection portions 150c, 155c so as to obtain a strip 120 of length corresponding to the longitudinal dimension of the blade that is to be fabricated, with an enlarged portion 130 formed by a portion of the extra thickness 103 and situated at a location corresponding to the position of the root of the blade that is to be fabricated.

In addition, cuts are formed at the ends of the portions 104a, 105a of the strip 104, at the ends 106a, 107a of the strip 106, and in the portions 104b, 106b thereof so that segments 140a and 140b remain on either side of the connection portions 140c, 160c, and also segments 150a, 150b remain on either side of the connection portions 150c, 155c, as shown in FIG. 3. The lengths of the segments 140a, 140b and 150a, 150b are determined as a function of the lengths of the inner and outer platforms of the blade that is to be fabricated.

Because of the non-interlinking firstly between the strip 102 and the portions 104a, 104b, and 105a of the strip 104 and also between the strip 102 and the portions 106a, 106b, and 107a of the strip 106, the segments 140a, 140b, 150a, and 150b can be folded out perpendicularly to the strip 102 without cutting yarns in order to form plates 140, 150, as shown in FIG. 4.

A fiber preform 200 of the blade that is to be fabricated is subsequently obtained by molding with the strip 102 being deformed to reproduce the curved profile of the airfoil of the blade. The two layers making up the bottom plate 140 are also deformed so as to reproduce a shape similar to the shape of the blade platform (in particular including its overhangs). Similarly, the top layer of the plate 150 is deformed to reproduce a shape similar to that of the wipers of the outer platform of the blade, and the bottom layer of the plate 150 is deformed to reproduce a shape similar to the shape of the overhangs of the outer platform of the blade (see FIG. 5). A preform 200 is thus obtained with an airfoil preform portion 220, a root preform portion 230 (including a tang preform), an inner platform preform portion 240 (of double thickness), an outer platform wiper preform portion 250, and a portion 260 constituting a preform for the overhangs of the blade outer platform.

Figure 6B:
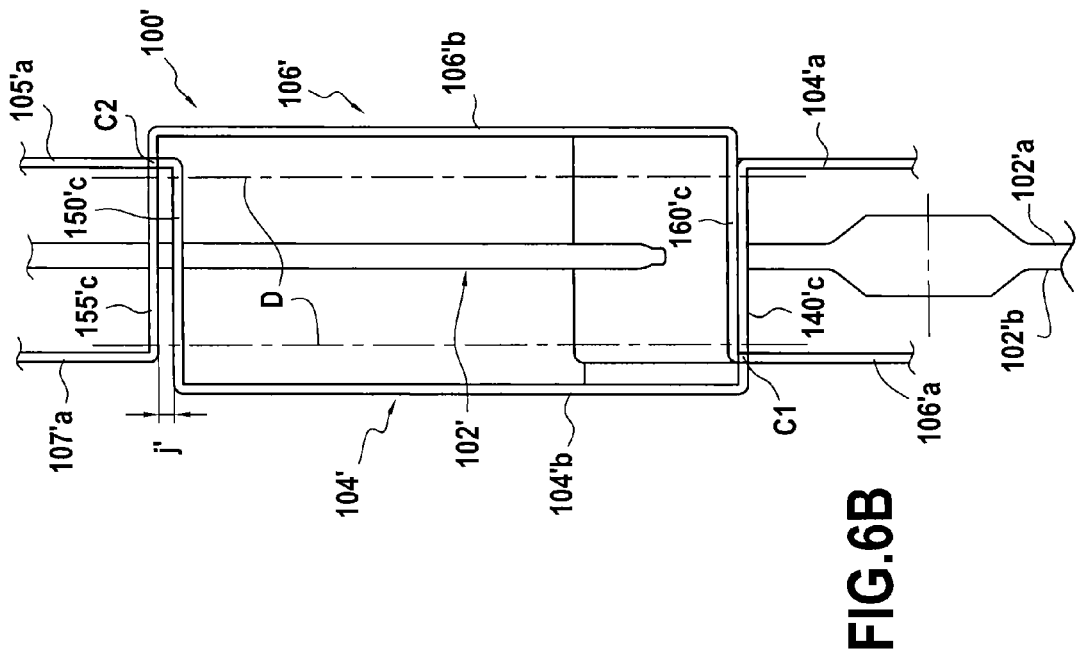
FIGS. 6A and 6B are highly diagrammatic views of another example of an arrangement of three sets of layers of yarns in a three-dimensional woven fiber blank for making a fiber preform for a blade of the kind shown in FIG. 1.
Figure 6A:
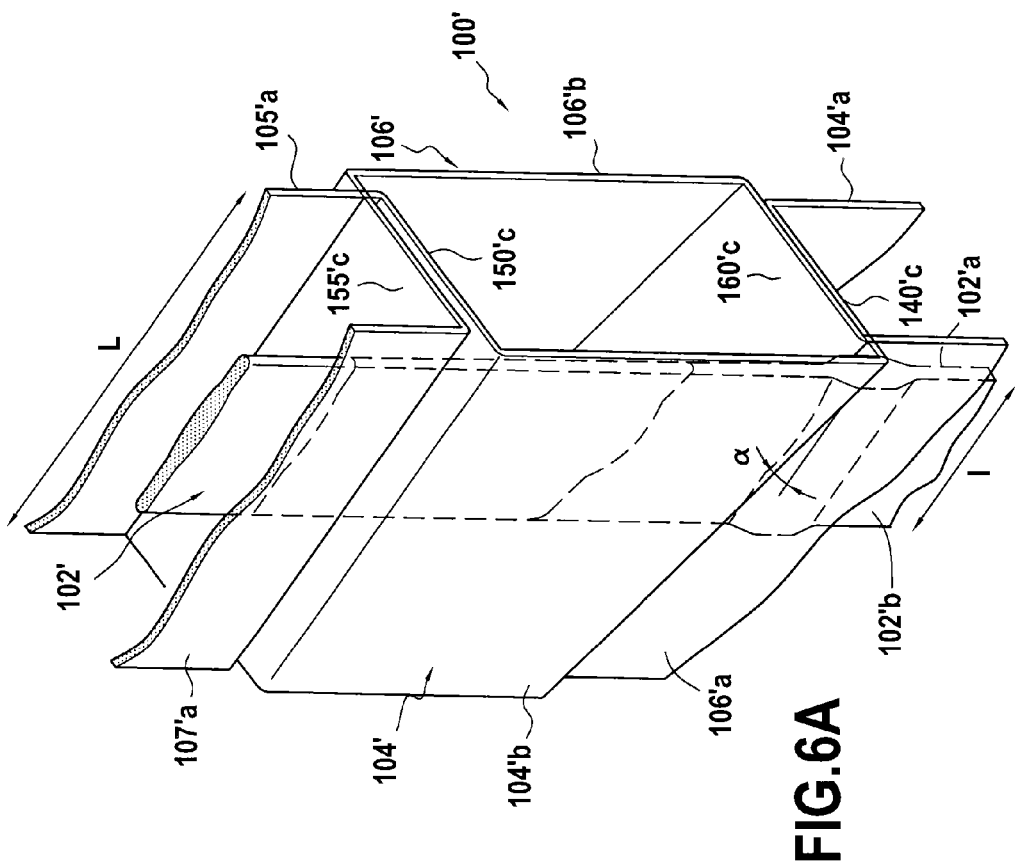

FIGS. 6A and 6B show another example of a fiber blank 100' from which a blade fiber preform can also be shaped.

Like the fiber blank described with reference to FIG. 2, this blank 100 comprises three portions 102', 104', and 106' that are obtained by three-dimensional weaving or multi-layer weaving, with only the envelopes of these three portions being shown in FIGS. 6A and 6B.

Compared with the blank of FIG. 2, the first portion 104'a of the strip 104' extends along and in the vicinity of the first face 102'a of the strip 102', while the first portion 106'a of the strip 106' extends along and in the vicinity of the second face 102'b of the strip 102' that is opposite from the first face. The second portion 104'b of the strip 104' extends along and in the vicinity of the second face 102'b of the strip 102', and the second portion 106'b of the strip 106' extends along and in the vicinity of the first face 102'a of the strip 102'. Finally, the third portion 105'a of the strip 104' extends along and in the vicinity of the first face 102'a of the strip 102', and the third portion 107'a of the strip 106' extends along and in the vicinity of the second face 102'b of the strip 102'.

The portions 104'a and 104'b of the strip 104' are connected together by a connection portion 140'c that crosses through the strip 102 in one direction, while the portions 106'a and 106'b of the strip 106 are connected together by a connection portion 160'c that crosses through the strip 102 in the opposite direction. Similarly, the portions 104'b and 105'a of the strip 104' are connected together by a connection portion 150'c that crosses through the strip 102 in one direction, while the portions 106'b and 107'a of the strip 106' are connected together by a connection portion 155'c that crosses through the strip 102 in the opposite direction and that is spaced apart from the connection strip 150'c by non-zero clearance j' (no clearance is provided in this example between the connection portions 140'c and 160'c).

The manner in which a fiber preform having a shape close to that of the blade that is to be fabricated can be obtained from this fiber blank 100' is identical to that described with reference to FIGS. 3 to 5, and is therefore not described again in detail.

In particular, cuts are formed at the ends of the connection portions 140'c, 160'c so as to avoid keeping the first portions 104'a and 106'a of the strips 104' and 106'. Similarly, at the outer platform of the blade to be fabricated, cuts are made at the ends of the connection portions 150'c, 155'c so as to eliminate the third portions 105'a and 107'a of the strips 104' and 106' (the lines of cut are shown diagrammatically in FIG. 6B by chain-dotted lines D). In other words, the plates that are subsequently deformed so as to reproduce shapes similar to those of the inner and outer platforms of the blade are constituted solely by the connection portions 140'c, 160'c and 105'a and 107'a. Thus, the crossing C1 between the layers of yarns of the first portion 106'a of the strip 106' and of the connection portion 140'c is eliminated, and similarly the crossing C2 between the layers of yarns of the third portion 105'a of the strip 104' and of the connection portion 155'c are also eliminated.

Only the differences relative to the FIG. 2 fiber blank are described in detail below. Naturally, the other characteristics of the blank described with reference to FIG. 2 are applicable to this embodiment.

Furthermore, from the two fiber blank examples 100 and 100', it is possible to imagine variant embodiments in which only the preform of the inner platform or only the preform of the outer platform of the blade that is to be fabricated is formed from a single fiber strip.

As described below, the steps of making a blade preform from a fiber blank are advantageously performed after the fibers of the blank have been treated and impregnated with a consolidation composition.

A method of three-dimensionally weaving the fiber blank 100 is described below in detail.

It is assumed that the weaving is performed with warp yarns extending in the longitudinal direction X of the blank, it being specified that it is also possible to perform weaving with the weft yarns extending in this direction.

Variation in the thickness of the strip 102 along its length is obtained by using weft yarns of varying weight. In a variant, or in addition, it is possible to vary the thread count of the warp yarns (number of yarns per unit length in the weft direction), a smaller thread count making greater thinning possible when shaping the preform by molding.

Thus, to obtain a blade airfoil profile as shown in flat projection in FIG. 7, it is possible to use three layers of warp yarns of varying weights and counts as shown in FIG. 8.

In an embodiment, the yarns used may be silicon carbide (SiC) yarns supplied under the name "Nicalon" by the Japanese supplier Nippon Carbon having a weight (expressed as a number of filaments) of 0.5K (i.e. 500 filaments).

The warp is made up using 0.5K SiC yarns and 1K SiC yarns obtained by uniting two 0.5K yarns, the two yarns being united by wrapping. The wrapping is advantageously implemented using a yarn of temporary nature suitable for being eliminated after weaving, e.g. a yarn of polyvinyl alcohol (PVA) that can be eliminated by being dissolved in water.

Table I below specifies for each column of warp yarns the thread count (number of yarns per centimeter in the length of the profile), the number of 0.5K yarns, the number of 1K yarns, and the thickness of the profile in millimeters (mm), where said thickness varies over the range about 1 mm to 2.5 mm:

TABLE I

| | Column | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Count | 6 | 6 | 6 | 6 | 6 | 6 | 6 | 8 | 8 | 8 | 8 | 8 | 8 | 8 | 8 | 8 | 8 | 8 | 6 |
| # 0.5K yarns | 3 | 3 | 3 | 3 | 3 | 3 | 3 | 2 | 1 | 0 | 0 | 0 | 0 | 0 | 0 | 0 | 2 | 1 | 3 |
| # 2 × 0.5K yarns | 0 | 0 | 0 | 0 | 0 | 0 | 0 | 1 | 2 | 3 | 3 | 3 | 3 | 3 | 3 | 3 | 1 | 2 | 0 |
| Thickness | 1 | 1 | 1 | 1 | 1 | 1 | 1.2 | 1.5 | 2 | 2.2 | 2.4 | 2.5 | 2.4 | 2.4 | 2.2 | 2.1 | 1.8 | 1.5 | 1.2 |

Naturally, depending on the available yarn weights, different combinations of numbers of layers of yarns and variations in thread count and in weight could be adopted for the profile that is to be obtained.

FIGS. 9A and 9B in warp section show two successive planes of a weave that can be used for weaving the fiber blank 100 of FIG. 2 outside the extra thickness 103.

The strip 102 of the fiber blank 100 comprises a set of warp yarn layers, with the number of layers in this example being equal to three (layers $C_{11}$, $C_{12}$, $C_{13}$). The warp yarns are linked together by weft yarns $t_1$ using three-dimensional weaving.

The strip 104 also has a set of warp yarn layers, e.g. likewise three layers (layers $C_{21}$, $C_{22}$, $C_{23}$) that are linked together by weft yarns $t_2$ by three-dimensional weaving, like the strip 102. The same applies for the strip 106 that comprises a set of warp yarn layers e.g. likewise three layers (layers $C_{31}$, $C_{32}$, $C_{33}$) that are linked together by weft yarns $t_3$ by three-dimensional weaving, like the strips 102 and 104.

It should be observed that the weft yarns $t_1$ do not extend into the warp yarn layers of the strips 104 and 106 and that the weft yarns $t_2$ do not extend into the warp yarn layers of the strips 102 and 106, and that the weft yarns $t_3$ do not extend into the warp yarn layers of the strips 102 and 104 so as to ensure that they are not linked together.

In the example shown, the weaving is multilayer weaving using a satin or multi-satin type weave. Other types of three-dimensional weaving could be used, for example multilayer weaving with a multiple plain weave or weaving with an interlock weave. The term "interlock weave" is used herein to mean a weave in which each layer of weft yarns links together a plurality of layers of warp yarns, with all of the yarns in a given weft column having the same path in the plane of the weave.

Various ways of performing three-dimensional weaving are described in particular in document WO 2006/136755, the content of which is incorporated herein by reference. Furthermore, it should be observed that the example described below applies in the same manner to the fiber blank example 100' described with reference to FIGS. 6A and 6B.

Figure 10:
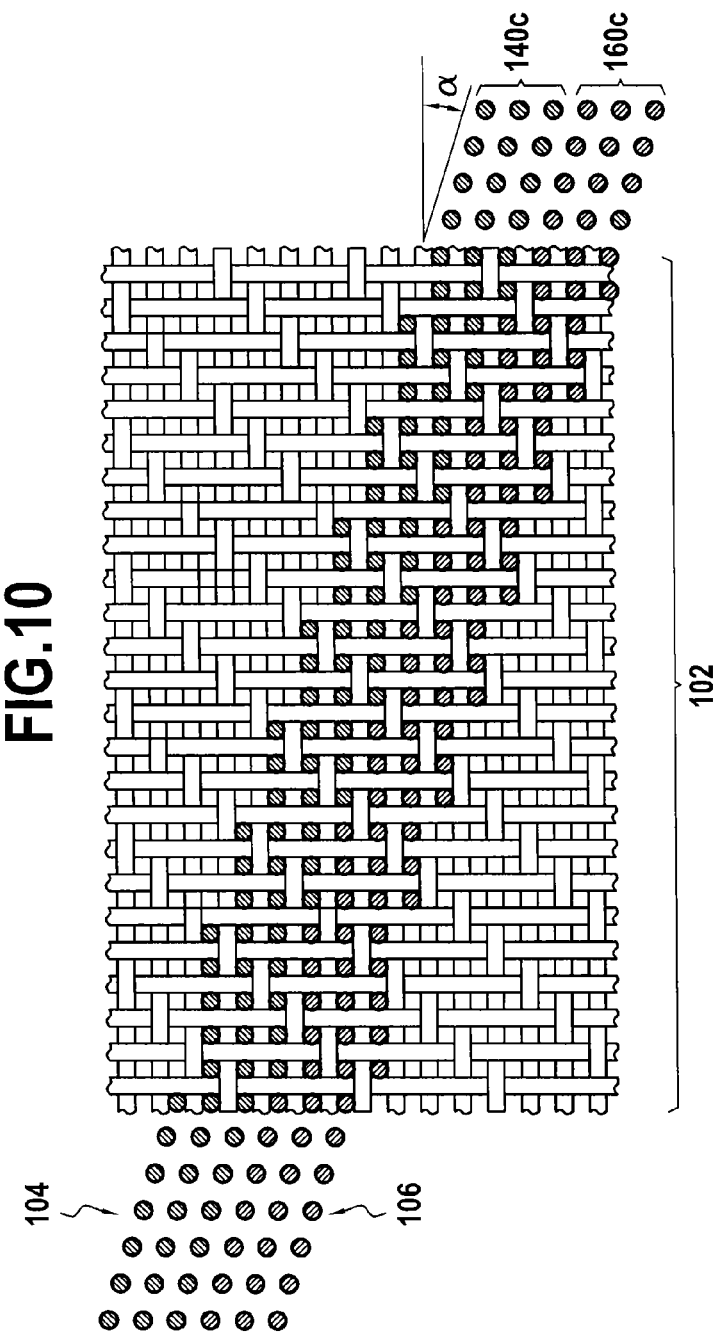
FIG. 10 is a fragmentary section view on a plane parallel to the warp and weft directions in a portion of the FIG. 2 fiber blank corresponding to the location of the junction between the airfoil and the inner platform of the blade.

FIG. 10 is a section view parallel to the warp and weft directions when the connection portions 140c, 160c of the strips 104 and 106 of the FIG. 2 fiber blank cross through the strip 102, these connection portions extending parallel to each other but without being spaced apart (the clearance j1 is zero). In FIG. 10, the warp yarns of these connection portions are shown in section. Each layer of warp yarns extends, in these connection portions 140c, 160c, in a direction that is at an angle α relative to the weft direction of the strip 102. During weaving, the strips 104 and 106 are caused to pass from one side of the strip 102 to the other by passing each warp yarn of the strips 104 and 106 individually through the set of warp and weft yarns of the strip 102 during the weaving process. Naturally, as mentioned above, these connection portions 140c, 160c could be spaced apart from each other, and/or could extend perpendicularly to the warp direction of the strip 102.

Figure 11:
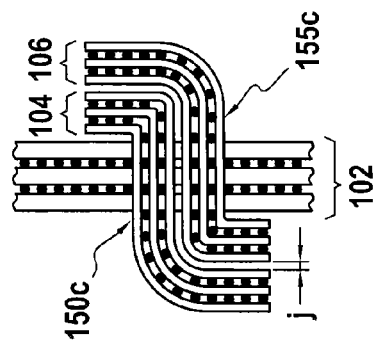
FIG. 11 is a fragmentary weft section view in a portion of the FIG. 2 fiber blank corresponding to the location of the junction between the airfoil and the outer platform of the blade.

FIG. 11 is a weft section view through the place where the connections portions 150c, 155c of the strips 104 and 106 cross through the strip 102. In the example shown, and as mentioned above, the connection portions 150c, 155c extend perpendicularly to the warp direction of the strip 102, and they are substantially parallel to one another while being spaced apart by clearance j2. Nevertheless, as for the connection portions 140c, 160c, it is also possible for the connection portions 150c, 155c to extend while making a non-zero angle relative to the normal to the warp direction, depending on the orientation desired for the outer platform, and/or they need not be spaced apart from each other (j2 may be zero).

For the fiber blank of FIGS. 6A and 6B, the strips 104' and 106' are caused to pass from one side of the strip 102' to the other by causing each warp yarn of the strip 104' to pass individually in one direction through the strip 102', and by causing each warp yarn of the strip 106' individually to pass through the strip 102' in the opposite direction.

The extra thickness 103 may be obtained by using weft yarns of greater weight and by using additional layers of weft yarns, as shown by way of example in FIG. 12A.

In FIG. 12A, the number of layers of weft yarns passes in this example from four to seven between a portion $102_1$ of the strip 102 that corresponds to the tang of the blade and a portion $102_3$ of the strip 102 that presents the extra thickness 103.

In addition, weft yarns $t_1$, $t'_1$, and $t''_1$ of different weights are used, the yarns $t_1$ being, for example, "Nicalon" SiC yarns having a weight of 0.5K (500 filaments), the yarns $t'_1$ being obtained by uniting two 0.5K yarns, and the yarns $t''_1$ by uniting three 0.5K yarns.

Weaving in the blank portion $102_3$ requires a greater number of layers of warp yarns than in the portion $102_1$. Advantageously, this is achieved in the transition between the portion $102_1$ and the portion $102_3$ by reducing the number of warp planes by constituting each warp plane in the portion $102_3$ by uniting warp yarns from two warp planes of the portion $102_1$. FIGS. 12B and 12C show two adjacent warp planes in the portion $102_1$, and FIG. 12D shows a warp plane obtained in the portion $102_3$ by uniting the warp planes of FIGS. 12B and 12C. In FIGS. 12B, 12C, and 12D, the different weights of the warp yarns are not shown (in the manner of FIG. 8) nor are the weights of the weft yarns (in the manner of FIG. 12A) in order to simplify the figure. Between FIGS. 12B & 12C and FIG. 12D, dashed lines show how the warp yarns of the various layers of FIGS. 12B and 12C form the warp yarn layers of FIG. 12D.

Naturally, other combinations of numbers of weft layers and weft yarn weights could be adopted to form the extra thickness 103.

In another embodiment shown diagrammatically in FIG. 13, the extra thickness 103 can be obtained by introducing an insert while weaving the strip 102.

In FIG. 13, the set $T_1$ of weft yarn layers in the portion $102_1$ of the strip 102 that corresponds to the tang of the blade is split by unlinking during weaving to form two subsets $T_{11}$ and $T_{12}$, and an insert $103_1$ is inserted between them. In the example shown, the portion $102_1$ is thicker than the portion $102_2$ of the strip 102 that corresponds to the blade airfoil. The transition between the portion $102_2$ and the portion $102_1$ may be achieved in the same manner as described above for the transition between the portions $102_1$ and $102_3$ in FIG. 12A. The sheets 104 and 106 pass through the sheet 102 via the connection portions 140c and 160c of FIG. 2, possibly by going through the thicker portion $102_1$ (the same applies for the fiber blank of FIGS. 6A and 6B).

At the end of the insert 103 remote from the portion $102_1$, the subsets $T_{11}$ and $T_{12}$ of weft yarn layers are reunited by weaving to form a portion $102'_1$ having the same thickness as the portion $102_1$, and then by a reduction in thickness, a portion $102'_2$ having the same thickness as the portion $102_2$, the portion $102'_2$ forming the portion that corresponds to a blade airfoil for the following woven blank.

The insert $103_1$ is preferably a single piece of ceramic, preferably made using the same ceramic material as is used for the matrix of the composite material of the blade that is to be fabricated. Thus, the insert $103_1$ may be an SiC block obtained by sintering SiC powder.

As shown very diagrammatically in FIG. 14, a plurality of fiber blanks 100, 100' may be obtained by weaving a strip 300 having one or more rows of successive fiber blanks formed therein. Extra length zones 310, 320 are formed in the warp direction (having warp yarns only) and in the weft direction (having weft yarns only) to avoid edge phenomena associated with weaving, leaving greater freedom in deformation when the preform is shaped, and providing transition zones between the blanks 100, 100'.

FIG. 15 shows a variant embodiment in which a strip 400 is made with a row of blanks 100, 100' woven in the weft direction perpendicularly to the longitudinal direction of the strip. Extra length zones 410, 420 are likewise formed in the warp direction and in the weft direction. A plurality of rows of blanks 100, 100' may be woven, with the width of the strip 400 being adapted for this purpose.

Figure 16:
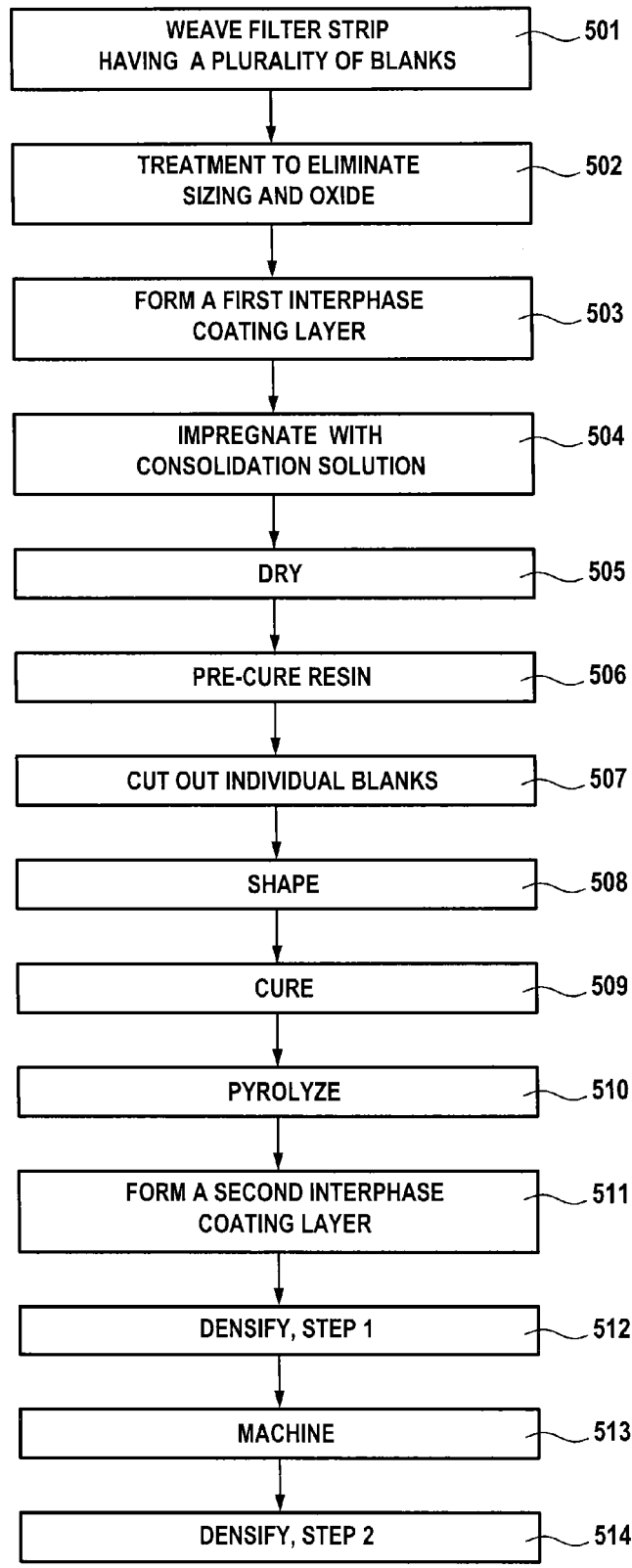
FIG. 16 shows successive steps of a method of fabricating a turbine engine blade in accordance with the invention.

Successive steps in a method of fabricating a blade of composite material in an implementation of the invention are given in FIG. 16.

In step 501, a fiber strip is woven by three-dimensional weaving, the strip comprising a plurality of fiber blanks, e.g. a plurality of rows of fiber blanks extending in the warp direction, as shown in FIG. 14.

For turbine engine blades that are to be used at high temperature, and in particular in a corrosive environment (in particular a wet environment), the weaving is performed using yarns made of ceramic fibers, in particular silicon carbide (SiC) fibers.

In step 502, the fiber strip is treated to eliminate the sizing present on the fibers and to eliminate the presence of oxide from the surfaces of the fibers. Oxide elimination is achieved by acid treatment, in particular by immersion in a bath of hydrochloric acid. If the sizing is not suitable for being eliminated by the acid treatment, a prior treatment for eliminating the sizing is performed, e.g. by decomposing it by brief heat treatment.

In step 503, a thin layer of interphase coating is formed on the fibers of the fiber strip by chemical vapor infiltration (CVI). The interphase coating material is constituted for example by pyrolytic carbon (PyC), by boron nitride (BN), or by boron-doped carbon (BC, e.g. having 5 atomic percent (at. %) to 20 at. % of B, the balance being C). The thin layer of interphase coating is preferably of small thickness, e.g. no more than 100 nanometers (nm), or better no more than 50 nm, so as to ensure the fiber blank conserves good capacity for deformation. The thickness is preferably no more than 10 nm.

In step 504, the fiber strip with the fibers coated in a thin layer of interphase coating is impregnated with a consolidation composition, typically a resin that might optionally be dissolved in a solvent. A carbon precursor resin may be used, e.g. a phenolic resin or a furanic resin, or a ceramic precursor resin could be used, e.g. a polysilazane resin or a polysiloxane resin constituting a precursor for SiC.

After drying and eliminating the solvent, if any, from the resin (step 505), the resin may be pre-cured (step 506). Pre-curing, i.e. incomplete cross-linking, serves to increase stiffness and thus strength, while preserving capacity for deformation as is required for making blade preforms.

In step 507, the individual fiber blanks are cut out, as shown in FIG. 3.

In step 508, a fiber blank as cut out in this way is shaped (as shown in FIGS. 4 and 5) and placed in a mold, e.g. a graphite mold, for shaping the airfoil and root preform portion and for shaping the platform preform portions.

Thereafter, the curing of the resin is completed (step 509) and the cured resin is pyrolyzed (step 510). Curing and pyrolyzing can follow one another by progressively raising the temperature in the mold.

After pyrolysis, a fiber preform is obtained that has been consolidated by the residue of the pyrolysis. The quantity of consolidation resin is selected so that the pyrolysis residue bonds the fibers of the preform together sufficiently to enable the preform to be handled while conserving its shape and without assistance from tooling, it being observed that the quantity of consolidation resin is preferably selected to be as small as possible.

Steps for eliminating sizing, for acid treatment, and for forming an interphase coating for an SiC fiber substrate are known. Reference can be made to document U.S. Pat. No. 5,071,679.

A second interphase layer is formed by CVI (step 511) so as to obtain overall a fiber-matrix interphase presenting thickness that is sufficient for it to perform its function of making the composite material non-brittle. The second interphase layer may be of a material selected from PyC, BN, and BC, and need not necessarily be the same material as that of the first interphase layer. The thickness of the second interphase layer is preferably not less than 100 nm.

It is preferable to make an interphase out of two layers, as described above. This is described in the French patent application filed under the No. 08/54937 by Snecma Propulsion Solide.

Thereafter the consolidated preform is densified with a matrix. For a turbine engine blade that is to be used at high temperature, and in particular in a corrosive medium, the matrix is a ceramic matrix, e.g. made of SiC. It is possible to perform densification by CVI, in which case forming the second interphase layer and densifying with the matrix may follow one another in the same oven.

Densification may be performed in two successive steps (steps 512 and 514) that are separated by a step 513 of machining the blade to the desired dimensions.

It should be observed that pre-machining may be performed between steps 509 and 510, i.e. after curing and before pyrolyzing the resin.

Figure 17:
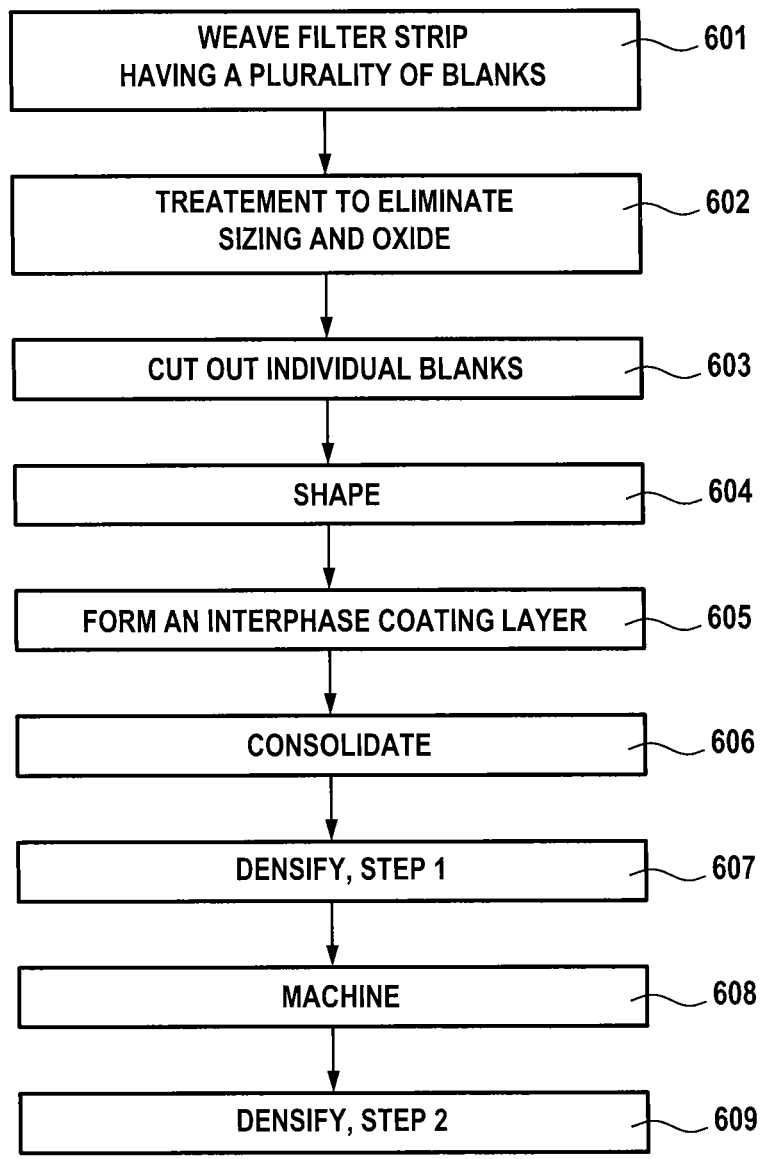
FIG. 17 shows successive steps of a method of fabricating a turbine engine blade in accordance with the invention.

Successive steps of a method of fabricating a blade of composite material in another implementation of the invention are given in FIG. 17.

The step 601 of three-dimensionally weaving a fiber strip comprising a plurality of fiber blanks, and the step 602 of treatment to eliminate sizing and oxide are similar to steps 501 and 502 of the implementation of FIG. 16.

In step 603, individual fiber blanks are cut out from the fiber strip, and then each individual fiber blank is shaped in a mold or jig (step 604) to obtain a blade fiber preform by shaping the airfoil and root preform portion and by shaping the platform preform portions.

In step 605, an interphase coating for making the material non-brittle is formed by CVI on the fibers of the preform while held in the jig. By way of example the interphase coating material is PyC, BN, or BC, as mentioned above. The thickness of the interphase coating is about one hundred to a few hundreds of nanometers.

With the preform still held in the jig, it is consolidated by partial densification (step 606), the consolidation being performed by forming a deposit of ceramic on the fibers by CVI.

The formation of the interphase coating by CVI and the consolidation by ceramic deposition by CVI can follow on one from the other in the same CVI oven.

The jig is preferably made of graphite and presents holes for facilitating the passage of reaction gases that provide the interphase deposit and the ceramic deposit by CVI.

Once consolidation is sufficient for the preform to be handled while conserving its shape and without assistance from support tooling, the consolidated preform is extracted from the jig and it is densified with a ceramic matrix by CVI. Densification may be performed in two successive steps (steps 607 and 609) separated by a step 608 of machining the blade to the desired dimensions.

In the description above, an airfoil profile of varying thickness is obtained by using yarns of varying weight and/or count. In a variant, it is possible to make the portion of the fiber blank that corresponds to the airfoil portion of the preform with a certain number of layers of same-weight yarns and with an unvarying count, the thickness of the profile being varied during machining after the first densification step or during pre-machining of the consolidated blank preform.

Furthermore, depending on the intended conditions of use for the blade, the fibers of the fiber reinforcement of the blade may be made of a material other than a ceramic, e.g. they may be made of carbon, and the matrix may be made of a material other than a ceramic, e.g. of carbon or of resin, the invention naturally also being applicable to fabricating blades out of a composite material having an organic matrix.

Second Embodiment

CMC Vanes for Turbine Nozzle Segments

Figure 18:
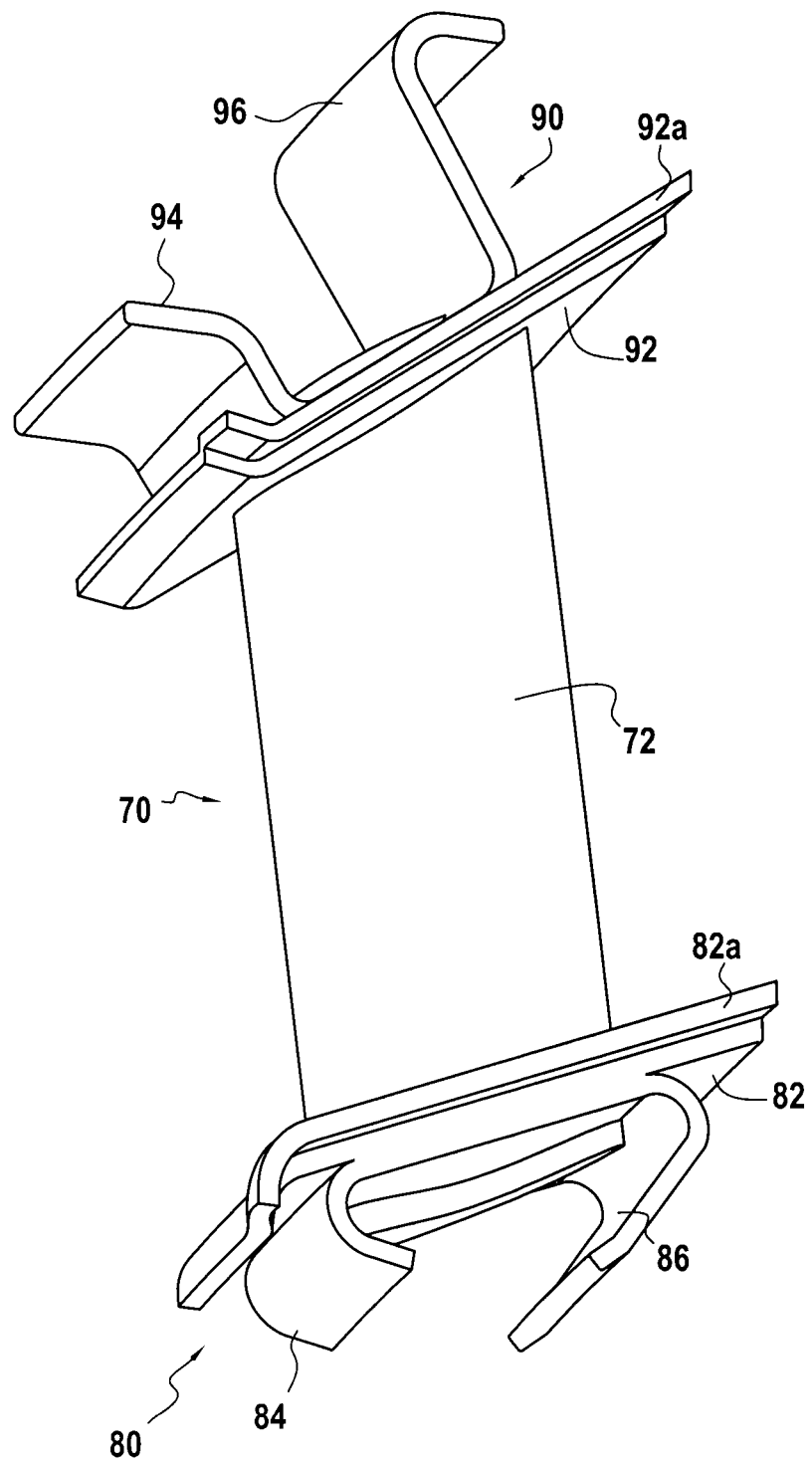
FIG. 18 is a perspective view of a turbomachine vane with incorporated outer and inner platforms.

The invention is also applicable to various types of turbine engines vanes with incorporated inner and outer platforms, in particular vanes to be assembled together for forming segments of turbine nozzles e.g. vanes for forming segments of a nozzle of a low-pressure (LP) turbine, such as the vane 70 shown in FIG. 18.

The vane 70 in FIG. 18 comprises an inner platform 80, an outer platform 90, and a unique airfoil 72 extending between the inner and outer platforms and being formed integrally therewith. The platform 80 comprises a portion 82 forming a flowpath delimiting inner platform portion and a portion forming hooks 84, 86 located on the inside of the portion 82. The platform 90 comprises a portion 92 forming a flowpath delimiting outer platform portion and a portion forming hooking legs 94, 96 located on the outside of the portion 92.

By platform portion forming a flowpath delimiting inner or outer platform portion is meant here an element forming part of the inner or outer wall of a passage through which gas flows at the level of a turbine nozzle.

In the example shown, the platform portions 82, 92 forming the flowpath delimiting platform portions show steps 82a, 92a along one of their longitudinal edges located in an axial plane after mounting in a turbine, such steps allowing overlapping of adjacent edges when vanes are assembled to form a turbine nozzle. The steps 82a, 92a are formed with an offset equivalent to the thickness of the platform portions 82, 92 in order to allow an overlapping without affecting the continuity of the flowpath wall. On the edges opposite to the ones showing the steps 82a, 92a, the platform portions 82, 92 extend beyond the hooks 84, 86 and hooking legs 94, 96 over a width corresponding to that of the steps 82a, 92a.

A method of fabricating a vane 70 such as the one of FIG. 18 will now be described.

Figure 19:
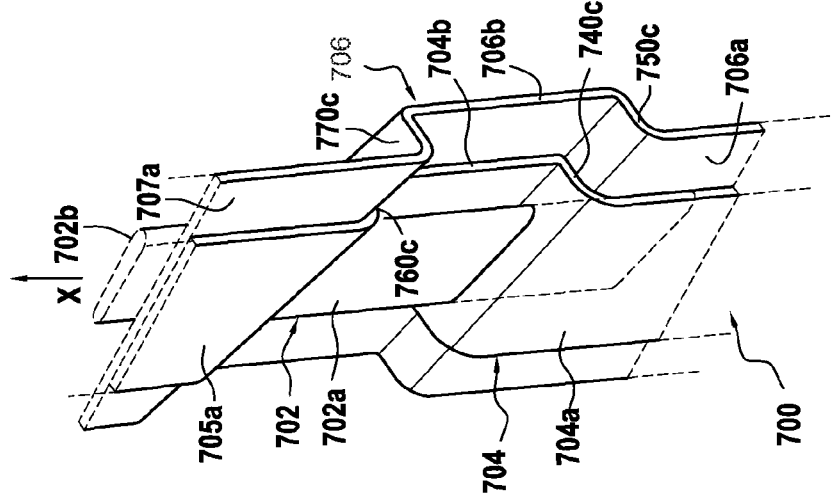
FIG. 19 is a highly diagrammatic representation of the disposition of two sets of layers of yarns in a three-dimensional woven fiber blank for use in making a fiber preform for a vane as shown in FIG. 18.

FIG. 19 is a highly diagrammatic view of a fiber blank 700 from which a vane fibrous preform may be formed in order, following densification by a matrix and possible machining, to obtain a CMC material vane such as the vane 70.

The blank 700 comprises three portions 702, 704, 706 obtained by three-dimensional weaving or multilayer weaving, only the envelopes of these three portions being shown on FIG. 19. After being shaped, the portion 702 is to constitute a preform portion for the airfoil 72. After being shaped, the portion 704 is to constitute preform portions for the platform portions 82, 92 forming the flowpath delimiting inner and outer platform portions. After being shaped, the portion 706 is to constitute preform portions for the hooks 84, 86 and legs 94, 96.

The three portions 702, 704, 706 are in the form of strips extending generally in a direction X that corresponds to the longitudinal direction of the vane that is to be made. The weaving if for example performed with warp yarns extending in the direction X, it being specified that it is also possible to perform weaving with weft yarns extending in this direction. In each portion 702, 704, 706, the warp yarns are arranged in a plurality of layers of yarns which are at least partially linked together by weft yarns of a plurality of layers of weft yarns. Various weaves may be used, for example interlock type, multi-satin type or multi-plain type weaves. Reference may be made to document WO 2006/136755.

The fibrous strip 702 may have a varying thickness determined as a function of the profile of the airfoil of the vane to be made and has a width selected as a function of the length of the flat developed profile of the vane. Variation in the thickness of the strip 702 along its length may be obtained by using warp yarns of varying weight. In a variant, or in addition, it is possible to vary the count of the warp yarns (number of yarns per unit length in the weft direction), a smaller count making greater thinning possible when shaping the preform.

The fiber strips 704, 706 are of substantially constant thickness determined as a function of the thickness of the platform 80, 90 of the blade that is to be made. The strip 704 has a width corresponding to the longer flat developed profile of the platform portions 82, 92 forming flowpath delimiting platform portions whereas the strip 706 has a width corresponding to the longer flat developed profile of the hooks 84, 86 and of the hooking legs 94, 96. The strips 704, 706 have a first portion 704a, 706a extending along and beside a first face 702a of the strip 702, a second portion 704b, 706b extending along and beside the second face 702b of the strip 702, and a third portion 705a, 707a extending along and beside the first face 702a of the strip 702.

The portions 704a and 704b of the strip 704 are connected together by a connection portion 740c that extends transversely relative to the strip 702 by crossing the latter at a first location that corresponds to the location of the platform portion 82 forming flowpath inner platform portion in the vane that is to be made. Similarly, the portions 706a and 706b of the strip 706 are connected together by a connection portion 750c that extends transversely relative to the strip 702 by crossing the latter and which is adjacent or in the immediate vicinity of the connecting portion 740c, on the outside thereof.

The portions 704b and 705a of the strip 704 are connected together by a connection portion 760c that extends transversely relative to the strip 702 by crossing the latter at a first location that corresponds to the location of the platform portion 92 forming inner flowpath delimiting platform portion in the vane that is to be made. Similarly, the portions 706b and 707a of the strip 706 are connected together by a connection portion 770c that extends transversely relative to the strip 702 by crossing the latter and which is adjacent or in the immediate vicinity of the connecting portion 760c, on the outside thereof.

The connecting portions 740c, 750c, 760c and 770c cross the strip 702 by making non-zero angles with respect to a plane normal to direction X in order, in the example considered, to respect the geometry of the vane that is to be made. The strips 702, 704, 706 are woven simultaneously without any linking between the strip 702 and the portions 704a, 704b, and 705a of the strip 704, without any linking between the strip 702 and the portions 706a, 706b, and 707a of the strip 706 and without any linking between the strips 704 and 706. A plurality of successive blanks 700 may advantageously be woven continuously in the direction X. It is also possible to weave simultaneously a plurality of parallel rows of blanks 700.

Figure 22:
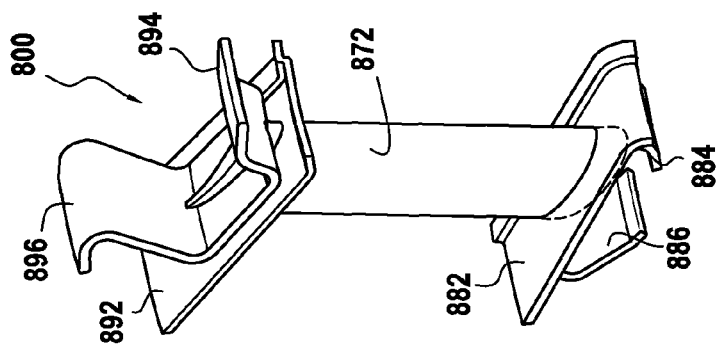
FIGS. 20, 21 and 22 show successive steps in making a fiber preform for a vane as shown in FIG. 18, starting from the fiber blank of FIG. 19.
Figure 21:
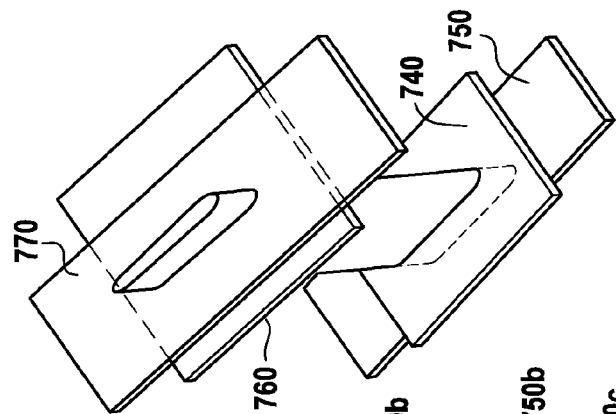
Figure 20:
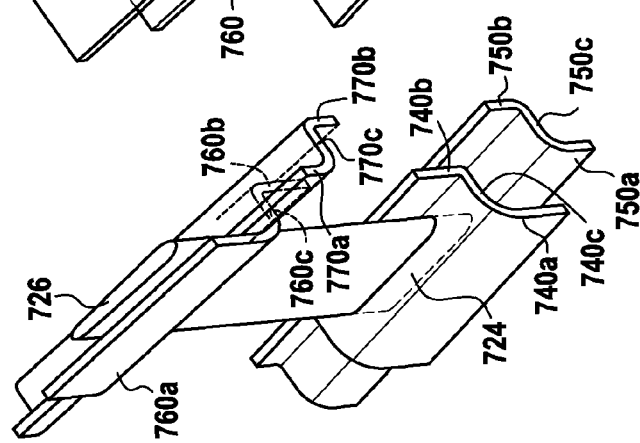

FIGS. 20 to 22 show highly diagrammatically how a fiber preform 800 of shape close to that of the vane 70 that is to be made can be obtained from the fiber blank 700.

The fibrous strip is cut at one end forwardly of the connecting portions 740c, 750c to form an extra-length 724 and is cut at another end rearwardly of the connecting portions 760c, 770c to form an extra-length 726, the extra-lengths 724, 726 contributing to maintaining the connecting portions in their positions at the level where the strip 702 is crossed.

The strips 704, 706 are cut to leave segments 740a, 740b on each side of the connecting portion 740c, to leave segments 750a, 750b on each side of the connecting portion 750c, to leave segments 760a, 760b on each side of the connecting portion 760c and to leave segments 770a, 770b on each side of the connecting portion 770c, as shown by FIG. 20. The lengths of the segments 740a, 740b, 760a, 760b are selected as a function of the flat developed lengths of the platform portions 82, 92 of the vane to be made forming inner and outer flowpath delimiting platform portions. The lengths of the segments 750a, 750b, 770a, 770b are selected as a function of the widths of the hooks and hooking legs of the inner and outer platforms of the vane to be made.

Because there is no linking with the strip 702, the segments 740a, 740b and 760a, 760b of the strip 704 may be folded out to form plates 740, 760, whereas the segments 750a, 750b and 770a, 770b of the strip 706 may be folded out to form plates 750, 770 as shown by FIG. 21. A fiber preform 800 of the vane 70 to be made is subsequently obtained by molding within a shaping tool with the strip 702 being deformed to obtain the profile of the airfoil 72 of the vane, the plates 740, 760 being deformed to obtain forms similar to the ones of the platform portions 82, 92 forming flowpath delimiting inner and outer platform portions, and the plates 750, 770 being deformed to obtain forms similar to the ones of the hooks 84, 86 and of the legs 94, 96. A vane preform 800 is thus obtained (FIG. 22) with preform portions 882, 892 of the platform portions 82, 92 forming flowpath delimiting inner and outer platform portions, hook preform portions 884, 886, hooking legs preform portions 894, 896 and airfoil preform portion 872.

Figure 23:
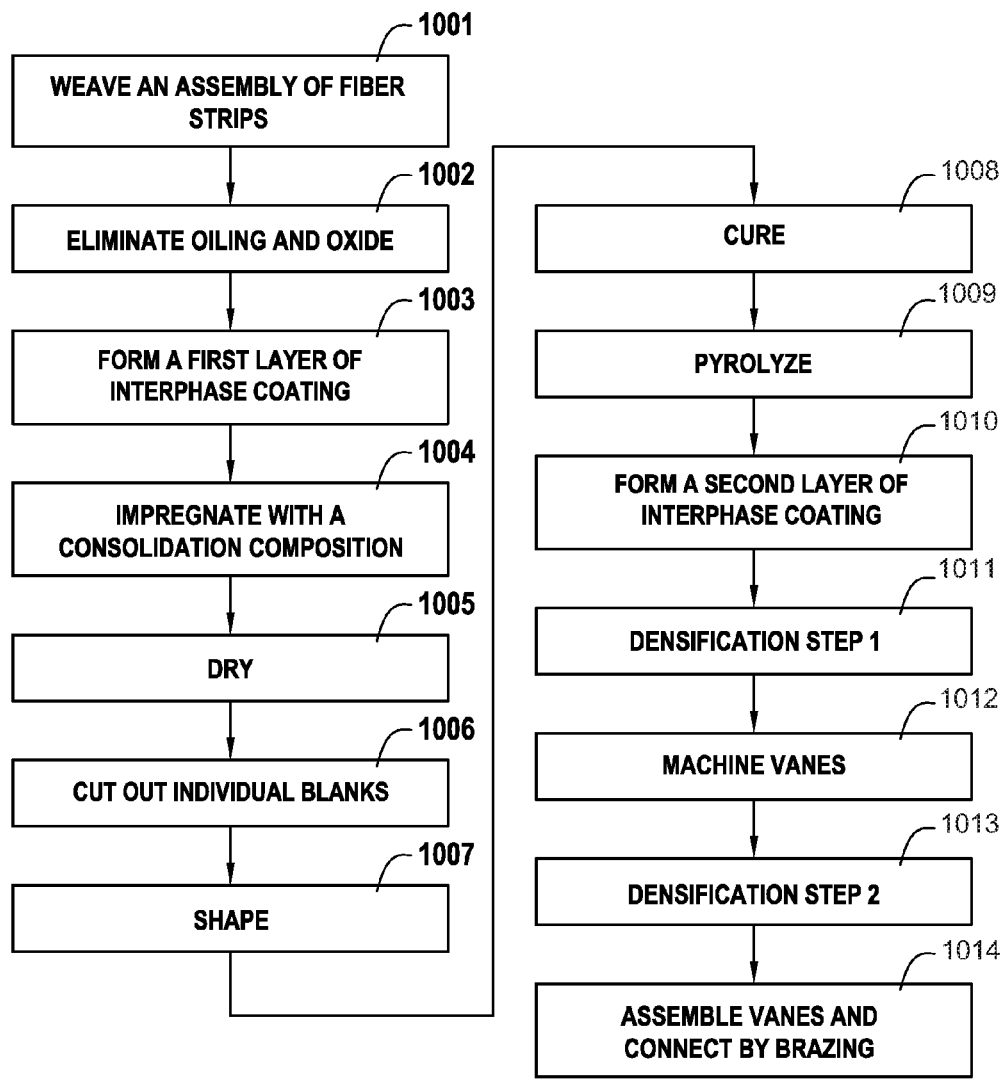
FIG. 23 shows successive steps in an implementation of a method of making a turbine nozzle segment in accordance with the invention.

It shall be noted that the steps for shaping a vane preform 800 from a fiber blank 700 may be advantageously be carried out after the fibers of the fiber blank 700 have been processed and impregnated with a consolidation composition such as now described with reference to FIG. 23 which shows successive steps of a method for fabricating a multi-airfoil turbine nozzle segment in CMC material.

In step 1001, an assembly of fiber strips is woven by three-dimensional weaving, comprising a plurality of fiber blanks 700 oriented for example in the warp direction, as shown by FIG. 19. Weaving may be performed with yarns made of ceramic material, such as yarns in a material based on silicon carbide (SiC), for example yarns provided under the name "Nicalon" by the Japanese company Nippon Carbon. Other ceramic yarns may be used, in particular refractory oxide yarns, such as yarns in a material based on aluminum oxide or alumina $Al_2O_3$, in particular for CMC materials of the oxide/oxide type (fibers of the fiber reinforcement and matrix in refractory oxide). Carbon yarns could also be used for a CMC material having carbon reinforcement.

In step 1002, the assembly of fiber strips is processed to eliminate the oiling and oxide present on the fibers. The oiling may be eliminated by thermal treatment and the oiling may be eliminated by acid treatment.

In step 1003, a thin layer of interphase coating is formed on the fibers of the fiber strip by chemical vapor infiltration (CVI). The interphase coating material is constituted for example by pyrolytic carbon (PyC), boron nitride (BN), or boron-doped carbon (BC). The thickness of the formed layer is preferably comprised between 10 nanometers and 100 nanometers to preserve capacity of deformation of the fiber blanks.

Steps of oiling elimination, acid treatment and formation of an interphase coating on a SiC fiber substrate are described in U.S. Pat. No. 5,071,679.

In step 1004, the assembly of fiber strips is subsequently impregnated with a consolidation composition, typically a carbon precursor resin or a ceramic precursor resin that might optionally be dissolved in a solvent.

After drying (step 1005), the individual fiber blanks are cut out (step 1006), as shown in FIG. 20.

In step 1007, a fiber blank as cut out in this way is shaped (as shown in FIGS. 21 and 22) and placed in a tooling, e.g. a graphite tooling, for shaping the airfoil preform portion, the preform portions for the platform portions forming flowpath delimiting inner and outer platform portions and the hooks and hooking legs preform portions.

Thereafter, the resin is cured (step 1008) and the pyrolyzed (step 1009). Curing and pyrolyzing can follow one another by progressively raising the temperature in the tooling.

After pyrolysis, a fiber preform is obtained that has been consolidated by the residue of the pyrolysis. The quantity of consolidation resin is selected to be sufficient, but not excessive, to ensure that the pyrolysis residue bonds the fibers of the preform together sufficiently to enable the preform to be handled while conserving its shape and without assistance from tooling.

A second interphase layer is formed by CVI (step 1010). The second interphase layer may be of a material selected from PyC, BN, and BC, and its thickness is preferably not less than 100 nm. Making an interphase out of two layers is described in document EP 2,154,119.

Thereafter the consolidated preform is densified with a ceramic matrix for example by CVI. The matrix may be made of SiC or may be a self-healing matrix comprising matrix phases of pyrolytic carbon PyC, of boron carbide $B_4C$ or of a ternary system Si—B—C as described in particular in U.S. Pat. Nos. 5,246,756 and 5,965,266. As indicated above, other types of matrix materials may be used, in particular refractory oxides, e.g. alumina, in particular for CMC materials of the oxide/oxide type. Densification may then be performed by a liquid process, namely by impregnation with a liquid precursor of the matrix material and transformation of the precursor by heat treatment or impregnation by a composition containing ceramic powder, the matrix being then obtained by sintering.

Densification is performed in two successive steps (steps 1011 and 1013) that are separated by a step 1012 of machining the vane to the desired dimensions. A vane is then obtained such as the one of FIG. 18.

Figure 24:
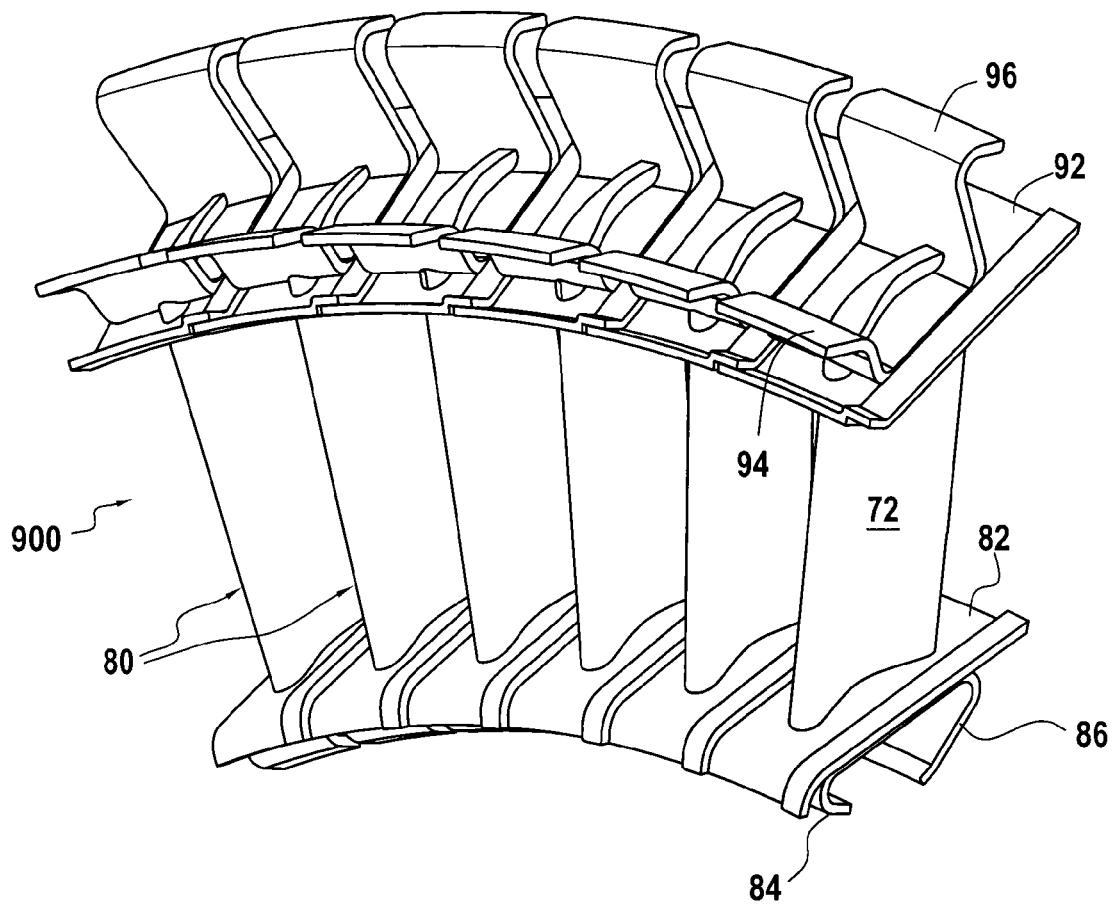
FIG. 24 is a perspective view of a turbine nozzle segment obtained by connecting together a plurality of vanes such as shown by FIG. 18.

The following step 1014 consists in assembling and connecting together a plurality of vanes to obtain a multi-airfoil CMC turbine nozzle segment 900 such as the one of FIG. 24. The vanes are connected together by brazing at the level where longitudinal edges of the platform portions 82, 92 forming flowpath delimiting platform portions overlap. Connections between adjacent vanes are thus obtained which extend over a portion of the inner surface of inner platforms forming flowpath delimiting inner platform portions and over a portion of the outer surface of outer platforms forming flowpath delimiting outer platform portions. Brazing of pieces in CMC material is known. Reference may be made for instance to documents FR 2,664,518 and FR 2,745,808 the content of which is herein incorporated, these documents describing various nickel based brazing compositions containing also titanium, silicon and possibly other metals such as copper or chromium.

The number of airfoils 72 in the turbine nozzle segment of FIG. 24 is 6. It could of course be higher or lower than 6.

It shall be noted that the assembling of single-airfoil vanes could be achieved without overlapping between adjoining platform portions, the inner and outer platform portions 82, 92 forming flowpath delimiting platform portions having then same width as the assembly of hooks 84, 86 and the assembly of hooking legs 94, 96, respectively. Brazing is then performed along the longitudinal edges of the platform portions forming flowpath delimiting platform portions and of the hooks and hooking legs.

Figure 25:
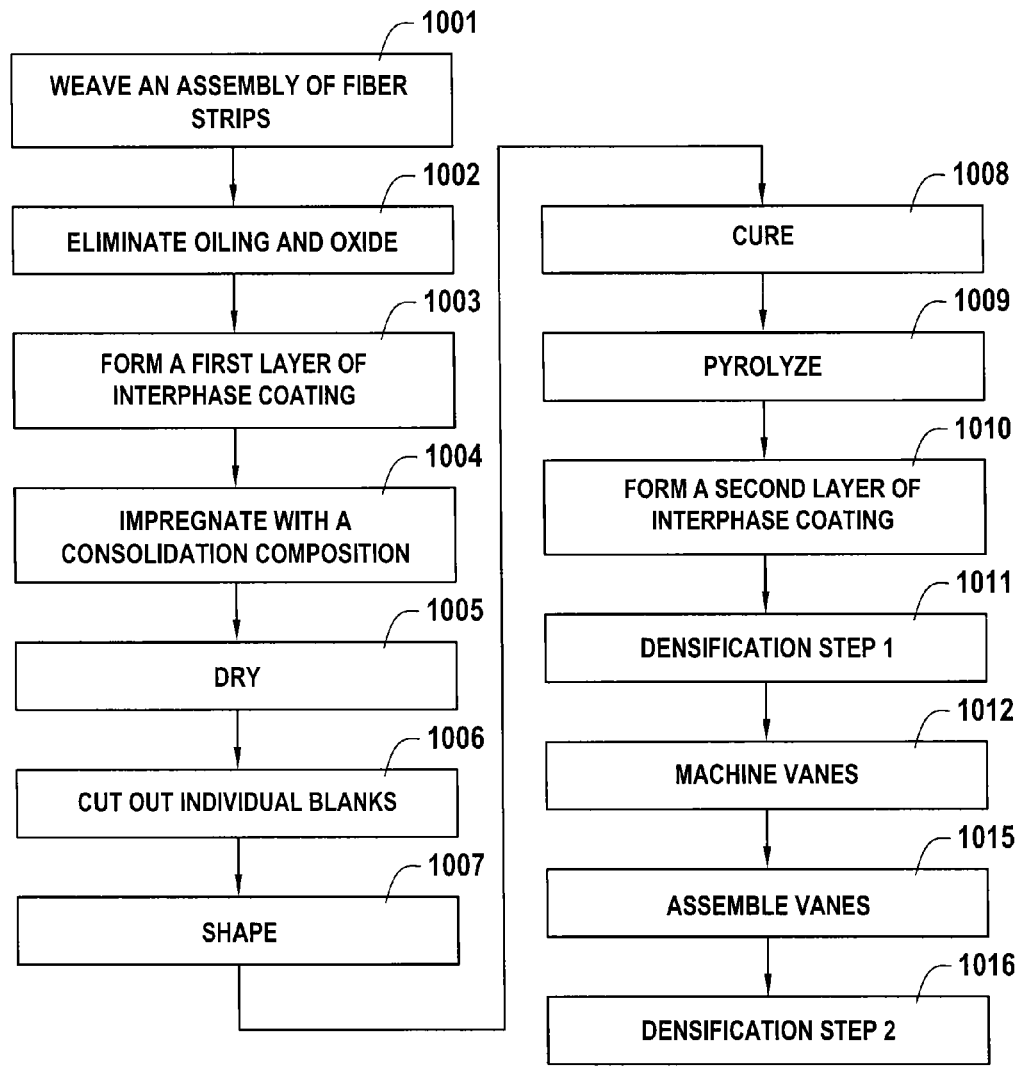
FIG. 25 shows successive steps in another implementation of a method of making a turbine nozzle segment in accordance with the invention.

FIG. 25 shows successive steps of another method of fabricating a turbine nozzle segment in CMC material. Steps 1001 to 1012 are identical to those of the method of FIG. 23.

After the machining step 1012 a plurality of vanes are held together to form a nozzle segment (step 1015). The assembling of the vanes may be performed by means of a tooling maintaining the vanes side by side and/or by pre-ceramic bonding, namely by bonding using a ceramic precursor resin, for example a polysilane, polysiloxane, polysilazane, polycarbosilane or silicone resin, as known in itself. A second densification or co-densification step is performed (step 1016) which is similar to step 1013 of the method of FIG. 23, but performed on a complete nozzle segment. When assembling by pre-ceramic bonding has been performed, the curing and the pyrolysis of the resin for transformation into ceramic may be performed during the temperature rising in view of the second densification step.

After a plurality of turbine nozzle segments 900 have been fabricated, they are mounted in a low pressure turbine casing of a turbine engine, to form a turbine nozzle 910.

Figure 26:
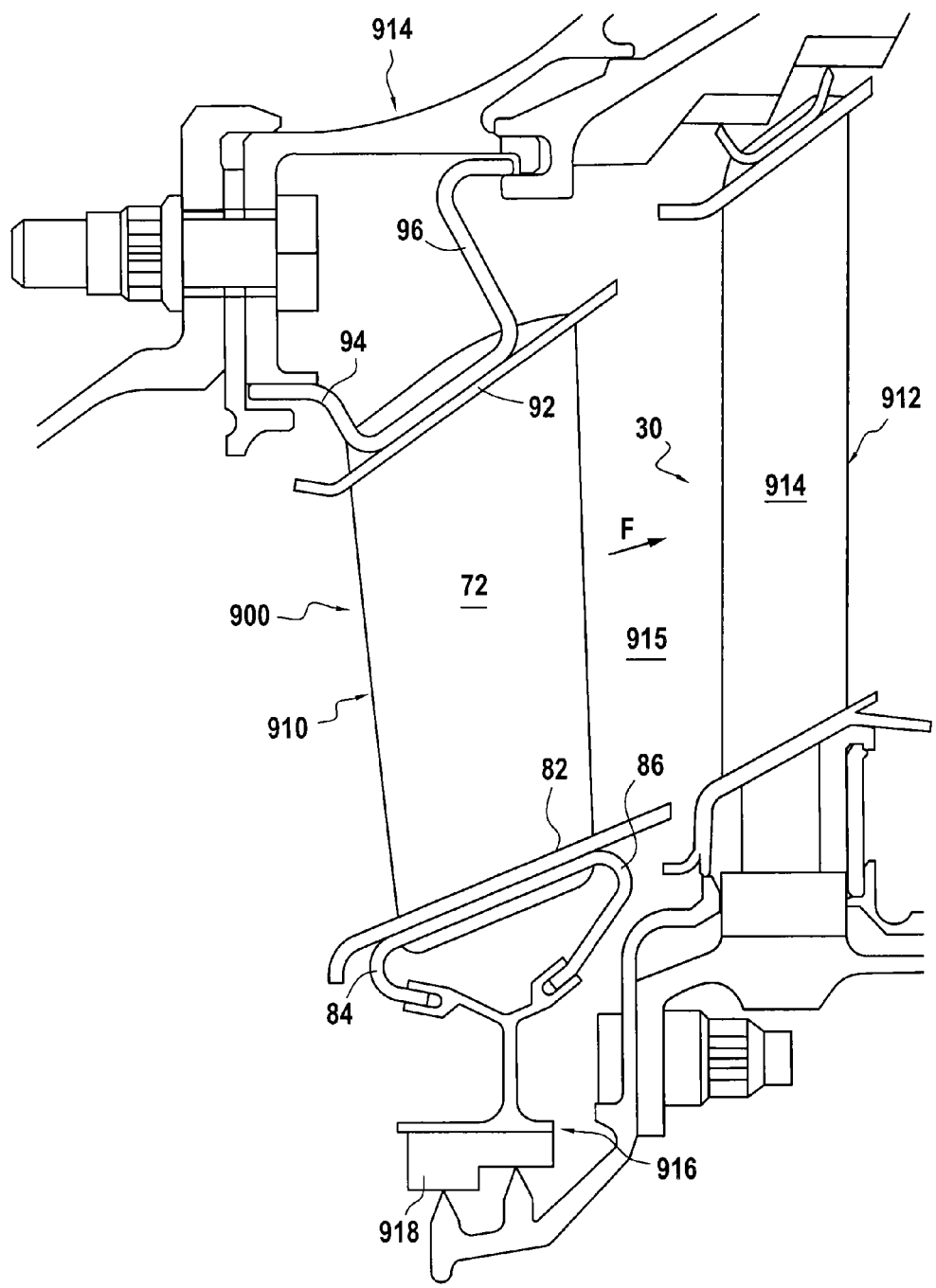
FIG. 26 is a very diagrammatic and partial half axial section view of a low-pressure turbine of a turbine engine comprising a turbine nozzle in CMC material.

FIG. 26 partially shows a multi-stage low pressure turbine of a turbine engine, which turbine comprises a plurality of turbine nozzles 910 alternating with mobile wheels 912 in the direction of the gas flowing through the turbine (arrow F), the turbine nozzles being mounted in a turbine casing 914.

The mobile wheels 912 carry a plurality of blades 914. The turbine nozzle 910 shown on FIG. 25 is formed of a plurality of adjoining nozzle segments 900 and is mounted in the turbine casing by means of the hooking legs 94, 96 of the vanes 70 from which the nozzle segments are formed.

The platform portions 82 and 92 of the inner and outer platforms of the vanes 70 delimit the flowpath 915 through the turbine nozzle 910.

On the inside, a ring 916 supporting an abradable material 918 is supported by the hooks 84, 86 of the vanes from which the nozzle segments are formed. The abradable material 918 cooperates with wipers carried by a mobile wheel adjacent the turbine nozzle 910, in a well-known manner.

Other Embodiments

In the second embodiment described above, hooks are formed on the inside of inner platforms in order to carry a ring supporting abradable material. Instead of hooks, overhangs could be formed.

The second embodiment described above relates to CMC vanes and nozzle segments for a low-pressure turbine. The invention is similarly applicable to CMC turbine nozzles for turbine spools other than low-pressure turbines as well as to compressor stators, in particular in compressor stages which in use are exposed to high temperatures.

Figure 27:
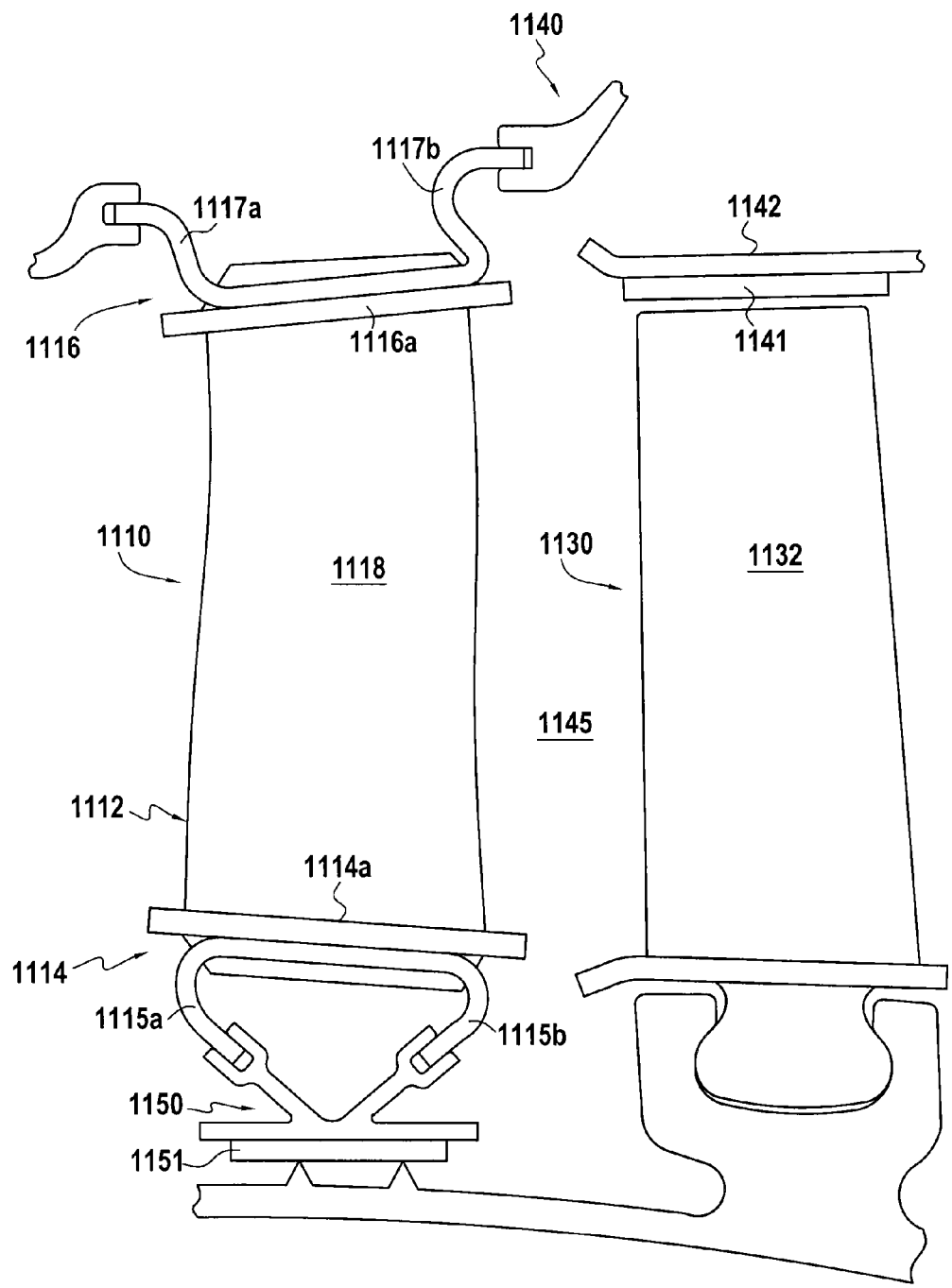
FIG. 27 is a very diagrammatic and partial half axial section view of a compressor of a turbine engine comprising a compressor stator in CMC material.

A multi-stage turbine engine compressor is partially and very diagrammatically shown by FIG. 27. The compressor, for example a high-pressure compressor, comprises a plurality of stators 1110 alternating with rotating wheels 1130 and mounted in a compressor casing 1140.

Each rotating wheel carries a plurality of blades 1132.

At least one of the compressor stators, e.g. the stator 1110 of FIG. 27 is formed by assembling stator segments 1112 in CMC material. Each stator segment is formed by assembling unitary single-airfoil vanes and comprises an inner platform assembly 1114, an outer platform assembly 1116 and airfoils 1118 extending between the inner and outer platform assemblies and formed integrally therewith. The platform assemblies 1114 and 1116 comprise portions forming flowpath delimiting inner and outer platform portions 1114a and 1116a which delimit the passage 1145 for the air flow through the compressor at the level of the compressor stator 1110.

On the inside, each platform assembly 1114 includes hooks 1115a, 1115b, whereas, on the outside, each platform assembly 1116 includes hooking legs 1117a, 1117b.

The stator segments are supported in the compressor casing 1140 by means of the hooking legs 1117a, 1117b whereas the hooks 1115a, 1115b support a metallic ring 1150 carrying abradable material 1151. The abradable material 1151 cooperate with wipers carried by a mobile wheel adjacent the compressor stator in a well-known manner.

The single-airfoil vanes constituting each compressor stator segment are made and assembled together as described above for unitary vanes forming turbine nozzle segments.

Here above, the fabrication of a compressor stator in a CMC material has been envisaged. When the temperatures to which the compressor stator is exposed in use are lower, in particular in the upstream stages of a compressor, an organic matrix composite (OMC) material may be used, made with fibers for instance of carbon or glass and with a polymer matrix.

A segment of OMC material compressor stator is obtained by assembling single-airfoil vanes.

After weaving an assembly of fiber strips, cutting out of individual blanks and shaping by means of a shaping tooling, as in steps 1001, 1006 and 1007 of the method of FIG. 24, each vane preform obtained is impregnated by a resin by injection or infusion while being kept in the shaping tooling. The resin is cured by heat treatment to obtain a partially densified consolidated vane preform. After machining, a plurality of consolidated vane preforms are assembled together and maintained in a tooling. The assembled consolidated preforms are co-densified, the co-densification being achieved by performing at least one cycle of resin impregnation and curing. A final machining may be performed. The resin used for consolidation and co-densification is a resin precursor of a polymer matrix such as an epoxide, bismaleimide (BMI) or polyimide resin, for example.

The invention claimed is:

1. A method of fabricating a turbine engine blade or vane out of composite material comprising fiber reinforcement densified by a matrix, the method comprising:
    performing three-dimensional weaving to make a single-piece fiber blank;
    shaping the fiber blank to obtain a single-piece fiber preform having a first portion forming a preform for at least a blade or vane airfoil, at least one second portion forming a preform for an inner part of a blade or vane inner platform or for an outer part of a blade or vane outer platform, and at least one third portion forming a preform for an outer part of the blade or vane inner platform or for an inner part of the blade or vane outer platform, wherein said second and third portions of the single-piece fiber preform each cross the first portion of said single-piece fiber preform; and
    densifying the fiber preform with the matrix in order to obtain the composite material blade or vane having fiber reinforcement constituted by the preform and densified by the matrix, and forming a single piece with at least one of the inner platform and the outer platform incorporated therein.

2. A method according to claim 1, wherein in a longitudinal direction corresponding to a longitudinal direction of the fiber blank that is to be fabricated, the fiber blank comprises:
    a first set of a plurality of yarn layers that are linked together to form the first portion of the fiber blank corresponding to at least the blade or vane airfoil preform;
    a second set of a plurality of yarn layers that are linked together at least locally to form at least the second portion of the fiber blank corresponding to the inner part of the blade or vane inner platform preform or to the outer part of the blade or vane outer platform preform; and
    a third set of a plurality of yarn layers that are linked together at least locally to form at least the third portion of the fiber blank corresponding to the outer part of the blade or vane inner platform preform or to the inner part of the blade or vane outer platform preform;
    the yarns of the first set of yarn layers being not linked with the yarns of the second and third sets of yarn layers; and
    yarns of the second and third sets of yarn layers crossing through the first set of yarn layers at a level of the or each second portion of the fiber blank and at a level of the or each third portion of the fiber blank, respectively.

3. A method according to claim 2, wherein the fiber blank is woven with second and third continuous sets of yarn layers and the shaping of the fiber blank includes eliminating portions of the second and third sets of yarn layers that lie outside the or each second fiber blank portion and the or each third fiber blank portion by cutting the portions of the second and third sets of yarn layers that lie outside the or each second fiber blank portion and the or each third fiber blank portion off.

4. A method according to claim 2, wherein yarns of the second and third sets of yarn layers cross through the first set of yarn layers in the same direction.

5. A method according to claim 2, wherein yarns of the second and third sets of yarn layers cross through the first set of yarn layers in opposite directions.

6. A method according to claim 1, wherein the blade or vane airfoil has a profile of varying thickness and the first portion of the fiber reinforcement corresponding to the first portion of the blade or vane has, in a longitudinal direction of the blade or vane, a constant number of layers of yarns.

7. A method according to claim 6, wherein the yarns of the first set of yarn layers are of varying weight.

8. A method according to claim 6, wherein the thread count of the yarns of the first set of yarn layers varies.

9. A method according to claim 1, wherein three-dimensional weaving is used to make a strip comprising a succession of fiber blanks.

10. A method according to claim 1, wherein the blank is woven with a longitudinal direction thereof that corresponds to a direction of the blade or vane that is to be fabricated extending in a weft direction.

11. A method according to claim 1, wherein the blank is woven with a longitudinal direction thereof that corresponds to a direction of the blade or vane that is to be fabricated extending in a warp direction.

12. A turbine engine fitted with at least one blade or vane fabricated using a method according to claim 1.

13. A method of fabricating a turbine engine blade out of composite material comprising fiber reinforcement densified by a matrix, the method comprising:
    performing three-dimensional weaving to make a single-piece fiber blank;
    shaping the fiber blank to obtain a single-piece fiber preform having a first portion forming a preform for a blade root and an airfoil, at least one second portion forming a preform for a blade inner platform or for wipers of a blade outer platform, and at least one third portion forming a preform for a blade inner platform reinforcement or for overhangs of the blade outer platform, wherein said second and third portions of the single-piece fiber preform each cross the first portion of said single-piece fiber preform; and
    densifying the fiber preform with the matrix in order to obtain the composite material blade having fiber reinforcement constituted by the preform and densified by the matrix, and forming a single piece with at least one of the inner platform and the outer platform incorporated therein.

14. A method according to claim 13, wherein, in a longitudinal direction corresponding to a longitudinal direction of the fiber blank that is to be fabricated, the fiber blank comprises:
    a first set of a plurality of yarn layers that are linked together to form the first portion of the fiber blank corresponding to the preform for the blade root and airfoil;
    a second set of a plurality of yarn layers that are linked together at least locally to form at least the second portion of the fiber blank corresponding to the preform for the blade inner platform or for the wipers of the blade outer platform; and
    a third set of a plurality of yarn layers that are linked together at least locally to form at least the third portion of the fiber blank corresponding to the preform for the reinforcement of the blade inner platform or for the overhangs of the blade outer platform;

the yarns of the first set of yarn layers being not linked with the yarns of the second and third sets of yarn layers; and yarns of the second and third sets of yarn layers crossing through the first set of yarn layers at the level of the or each second portion of the fiber blank and at the level of the or each third portion of the fiber blank, respectively.

15. A method of fabricating a turbine engine vane out of composite material comprising fiber reinforcement densified by a matrix, the method comprising:

performing three-dimensional weaving to make a single-piece fiber blank;

shaping the fiber blank to obtain a single-piece fiber preform having a first portion forming a preform for a vane airfoil, at least one second portion forming a preform for hooks or overhangs of a vane inner platform on the inside of the vane inner platform or forming a preform for hooking legs of a vane outer platform on an outside of the vane outer platform portion, and third portions forming a preform for a vane inner platform portion forming a flowpath delimiting inner platform portion and forming a preform for a vane outer platform portion forming a flowpath delimiting outer wall portion, wherein said second and third portions of the single-piece fiber preform each cross the first portion of said single-piece fiber preform; and densifying the fiber preform with the matrix in order to obtain a composite material vane having fiber reinforcement constituted by the preform and densified by the matrix, and forming a single piece with inner and outer platforms incorporated therein.

16. A method according to claim 15, wherein, in a longitudinal direction corresponding to a longitudinal direction of the fiber blank that is to be fabricated, the fiber blank comprises:

a first set of a plurality of yarn layers that are linked together to form the first portion of the fiber blank corresponding to the preform for the vane airfoil;

a second set of a plurality of yarn layers that are linked together at least locally to form at least the second portion of the fiber blank corresponding to the preform for the hooks or overhangs of the vane inner platform or for the hooking legs of the vane outer platform; and a third set of a plurality of yarn layers that are linked together at least locally to form the third portions of the fiber blank corresponding to the preforms for the blade inner platform portion and for the blade outer platform portion;

the yarns of the first set of yarn layers being not linked with the yarns of the second and third sets of yarn layers; and yarns of the second and third sets of yarn layers crossing through the first set of yarn layers at a level of the or each second portion of the fiber blank and at a level of each third portion of the fiber blank, respectively.

17. A method of fabricating a turbine nozzle segment or compressor stator segment out of a composite material comprising fiber reinforcement densified by a matrix for a turbine engine, the method comprising:

making a plurality of turbine nozzle vanes or compressor stator vanes each including an inner platform, an outer platform and an airfoil extending between the inner and outer platforms and forming one piece therewith, the making of each vane comprising:

performing three-dimensional weaving to make a single-piece fiber blank;

shaping the fiber blank to obtain a single-piece fiber preform having a first portion forming a preform for a vane airfoil, at least one second portion forming a preform for hooks or overhangs of the vane inner platform on an inside of the vane inner platform or forming a preform for hooking legs of the vane outer platform on an outside of the vane outer platform, and third portions forming a preform for a vane inner platform portion forming a flowpath delimiting inner platform portion and forming a preform for a vane outer platform portion forming a flowpath delimiting outer platform portion, wherein said second and third portions of the single-piece fiber preform each cross the first portion of said single-piece fiber preform; and densifying the fiber preform with the matrix in order to obtain a composite material vane having fiber reinforcement constituted by the preform and densified by the matrix, and forming a single piece with the inner and outer platforms incorporated therein; and assembling and connecting together a plurality of vanes to form a multi-vane turbine nozzle segment or compressor stator segment out of a composite material, the vanes being connected together by a process including a step selected from a brazing step and a step of connection by co-densification by a matrix of a plurality of vanes assembled together at an intermediary stage of densification.

18. A method according to claim 17, wherein the making of each vane comprises a step of partial densification of the preform by a matrix and a subsequent machining step, and the connection of a plurality of vanes together comprises assembling machined vanes together and co-densification by a matrix of the assembled machined vanes.

19. A method according to claim 17 for fabricating a turbine nozzle segment or compressor stator segment out of a ceramic matrix composite material, wherein the assembling of the machined vanes together comprises a pre-ceramic bonding step.

20. A method according to claim 17 for fabricating a turbine nozzle segment or compressor stator segment out of a ceramic matrix composite material, wherein the making of each vane comprises a first and a second step of densification by a ceramic matrix separated by a machining step, and the connection of a plurality of vanes together comprises a step of brazing together vanes assembled together after the second densification step.

21. A method according to claim 17, wherein, in a longitudinal direction corresponding to a longitudinal direction of the fiber blank that is to be fabricated, the fiber blank comprises:

a first set of a plurality of yarn layers that are linked together to form the first portion of the fiber blank corresponding to the preform for the vane airfoil;

a second set of a plurality of yarn layers that are linked together at least locally to form at least the second portion of the fiber blank corresponding to the preform for the hooks or overhangs of the vane inner platform or for the hooking legs of the vane outer platform, and a third set of a plurality of yarn layers that are linked together at least locally to form the third portions of the fiber blank corresponding to the preforms for the vane inner platform portion and for the vane outer platform portion;

the yarns of the first set of yarn layers being not linked with the yarns of the second and third sets of yarn layers; and yarns of the second and third sets of yarn layers crossing through the first set of yarn layers at a level of the or each second portion of the fiber blank and at a level of each third portion of the fiber blank, respectively.

22. A turbine engine blade or vane made of composite material comprising fiber reinforcement obtained by three-dimensional weaving of yarns and densified by a matrix, the blade or vane comprising:
    a first portion constituting at least an airfoil of the blade or vane and that is formed integrally with:
        at least one second portion constituting an inner part of a blade or vane inner platform or an outer part of a blade or vane outer platform; and
        at least one third portion constituting an outer part of the blade or vane inner platform or an inner part of the blade or vane outer platform, wherein said second and third portions of the single-piece fiber preform each cross the first portion of said single-piece fiber preform;
    first, second and third portions of the fiber reinforcement corresponding to the first, second, and third portions of the blade or vane being mutually interleaved at least in part with the yarns of the first portion of fiber reinforcement penetrating into the second portion of fiber reinforcement and into the third portion of the fiber reinforcement.

23. A blade or vane according to claim 22, made of ceramic matrix composite material.

24. A blade or vane according to claim 22, wherein yarns of the second portion and of the third portion of the fiber reinforcement cross through the first portion of the fiber reinforcement.

25. A blade or vane according to claim 22, wherein the blade or vane airfoil has a profile of varying thickness and the first portion of the fiber reinforcement corresponding to the first portion of the blade or vane has, in a longitudinal direction of the blade or vane, a constant number of layers of yarns that are of varying weight and/or varying thread count.

26. A blade or vane according to claim 22, wherein the blade or vane airfoil has a profile of varying thickness and the first portion of the fiber reinforcement corresponding to the first portion of the blade or vane has a constant number of layers of yarns extending in the longitudinal direction of the blade or vane.

27. A turbine engine fitted with at least one blade or vane according to claim 22.

28. A turbine engine blade made of composite material comprising fiber reinforcement obtained by three-dimensional weaving of yarns and densified by a matrix, the blade comprising:
    a first portion constituting an airfoil an root of the blade and that is formed integrally with:
        at least one second portion constituting a blade inner platform or wipers of a blade outer platform; and
        at least one third portion constituting an inner platform reinforcement or overhangs of the blade outer platform, wherein said second and third portions of the single-piece fiber preform each cross the first portion of said single-piece fiber preform;
    first, second and third portions of the fiber reinforcement corresponding to the first, second, and third blade portions being mutually interleaved at least in part, with the yarns of the first portion of fiber reinforcement penetrating into the second portion of fiber reinforcement and into the third portion of the fiber reinforcement.

29. A blade according to claim 28, wherein yarns of the second portion and of the third portion of the fiber reinforcement cross through the first portion of the fiber reinforcement.

30. A turbine engine vane made of composite material comprising fiber reinforcement obtained by three-dimensional weaving of yarns and densified by a matrix, the vane comprising:
    a first portion constituting an airfoil of the blade or vane and that is formed integrally with:
        at least one second portion constituting hooks or overhangs on an inside of a vane inner platform or hooking legs on an outside of a vane outer platform; and
        at least one third portion constituting a flowpath delimiting inner platform portion or a flowpath delimiting outer platform portion, wherein said second and third portions of the single-piece fiber preform each cross the first portion of said single-piece fiber preform;
    first, second and third portions of the fiber reinforcement corresponding to the first, second, and third portions of the vane being mutually interleaved at least in part with the yarns of the first portion of fiber reinforcement penetrating into the second portion of fiber reinforcement and into the third portion of the fiber reinforcement.

31. A vane according to claim 28, wherein yarns of the second portion and of the third portion of the fiber reinforcement cross through the first portion of the fiber reinforcement.

32. A turbine nozzle segment or a compressor stator segment comprising a plurality of vanes according to claim 30 which are connected together.

* * * * *